United States Patent
Hanumara et al.

(10) Patent No.: US 9,671,944 B2
(45) Date of Patent: Jun. 6, 2017

(54) INCLUSION/EXCLUSION USER INTERFACE CONTROLS FOR RANGE FILTERS

(71) Applicant: Microsoft Technology Licensing, LLC, Redmond, WA (US)

(72) Inventors: Poornima Hanumara, Seattle, WA (US); Avi Samuel Gavlovski, Kirkland, WA (US); Benjamin Edward Rampson, Woodinville, WA (US); Robert Alan Meyers, Redmond, WA (US); Jeremy Jude Alexi Edwards, Bothell, WA (US); Sachin Patney, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 14/103,309

(22) Filed: Dec. 11, 2013

(65) Prior Publication Data
US 2015/0020016 A1    Jan. 15, 2015

Related U.S. Application Data

(60) Provisional application No. 61/845,750, filed on Jul. 12, 2013.

(51) Int. Cl.
*G06F 3/048*  (2013.01)
*G06F 3/0484*  (2013.01)

(52) U.S. Cl.
CPC .................. *G06F 3/04847* (2013.01)

(58) Field of Classification Search
CPC ................................ G06F 3/04847

USPC ........................................... 715/771
See application file for complete search history.

(56) References Cited

U.S. PATENT DOCUMENTS

| | | | |
|---|---|---|---|
| 5,850,531 A | 12/1998 | Cox et al. | |
| 6,014,661 A * | 1/2000 | Ahlberg | G06F 17/30572 |
| 6,405,195 B1 * | 6/2002 | Ahlberg | 709/219 |
| 7,216,116 B1 | 5/2007 | Nilsson et al. | |
| 7,269,801 B2 * | 9/2007 | Kyle | G08G 1/0969 |
| | | | 715/771 |
| 7,685,528 B2 * | 3/2010 | Keeley | G06F 8/34 |
| | | | 715/762 |
| 7,730,141 B2 * | 6/2010 | Costea | G06Q 10/107 |
| | | | 709/203 |
| 8,346,682 B2 * | 1/2013 | Steed | G06T 11/206 |
| | | | 706/11 |

(Continued)

OTHER PUBLICATIONS

Worth et al., "range slider with no max limit", available at <https://groups.google.com/forum/#!msg/jquery-ui/yk2uXxoS4mc/Mn9xlujEqEIJ>, available on Sep. 19, 2009, 2 pages.*

(Continued)

*Primary Examiner* — Reza Nabi
*Assistant Examiner* — Daniel Rodriguez
(74) *Attorney, Agent, or Firm* — Lee & Hayes, PLLC; Charles L. Warner

(57) ABSTRACT

Concepts and technologies are described herein for providing a range filter user interface with selectable range controls that toggle between inclusive and exclusive modes. The range controls visually indicate configuration in an inclusive mode or an exclusive mode. Upon selection of a range control, the range control switches between inclusive and exclusive modes, and provides visual indication of the current mode.

18 Claims, 15 Drawing Sheets

(56) References Cited

U.S. PATENT DOCUMENTS

| | | | |
|---|---|---|---|
| 8,368,715 B2* | 2/2013 | Kimijima | H04S 7/30 345/589 |
| 8,386,951 B2 | 2/2013 | Tallman | |
| 2002/0105532 A1* | 8/2002 | Oblinger | G06F 17/30997 715/701 |
| 2002/0105550 A1* | 8/2002 | Biebesheimer | G06F 17/30696 715/835 |
| 2002/0149614 A1* | 10/2002 | Biebesheimer | G06F 17/3053 715/738 |
| 2004/0125137 A1* | 7/2004 | Stata | G06Q 10/109 715/764 |
| 2004/0135826 A1* | 7/2004 | Pickering | G06F 3/04847 715/860 |
| 2008/0086451 A1* | 4/2008 | Torres et al. | 707/3 |
| 2008/0120565 A1* | 5/2008 | Stiso | G06F 3/04847 715/771 |
| 2009/0293019 A1 | 11/2009 | Raffel et al. | |
| 2010/0005420 A1 | 1/2010 | Schneider | |
| 2010/0241981 A1 | 9/2010 | Mirtich | |
| 2010/0306694 A1* | 12/2010 | Conzola et al. | 715/786 |
| 2010/0306704 A1 | 12/2010 | Cotterill | |
| 2011/0295863 A1* | 12/2011 | Weir | G06F 17/30973 707/754 |
| 2014/0096056 A1* | 4/2014 | Latzina | G06F 17/30572 715/771 |
| 2014/0146068 A1* | 5/2014 | Lala | G06F 3/04847 345/589 |
| 2014/0173501 A1* | 6/2014 | Wu | G06F 3/04842 715/781 |
| 2014/0282252 A1* | 9/2014 | Edwards | G06F 3/04847 715/833 |
| 2015/0325408 A1* | 11/2015 | Yamashita | G06F 3/048 250/492.3 |

OTHER PUBLICATIONS

Ahlberg et al., "Exploring Terra Incognita in the Design Space of Query Devices", Published on: Jun. 6, 1995, Available at: <https://static.aminer.org/pdf/PDF/000/179/801/exploring_terra_incognita_in_the_design_space_of_query_devices.pdf>, 20 pages.*

Ernie Yu, "Creating a Java Swing Range Slider," Dec. 27, 2010, downloaded from http://ernienotes.wordpress.com/2010/12/27/creating-a-java-swing-range-slider/, pp. 5.

Ahlberg, et al., "Exploring Terra Incognita in the Design Space of Query Devices", Published on: Jun. 6, 1995, Available at: http://pdf.aminer.org/000/179/801/exploring_terra_incognita_in_the_design_space_of_query_devices.pdf, 34 pages.

International Search Report mailed Sep. 24, 2014 for PCT Application No. PCT/US2014/045844, 12 Pages.

PCT Written Opinion mailed Jun. 15, 2015 for PCT Application No. PCT/US14/45844, 7 Pages.

International Preliminary Report on Patentability Issued in PCT Application No. PCT/US2014/045844, Mailed Date: Sep. 10, 2015, 8 Pages.

* cited by examiner

INCLUSION/EXCLUSION USER INTERFACE CONTROLS FOR RANGE FILTERS

CROSS-REFERENCE TO RELATED APPLICATION(S)

This application claims the benefit of U.S. Provisional Patent Application Ser. No. 61/845,750 filed on Jul. 12, 2013, entitled "INCLUSION/EXCLUSION USER INTERFACE FOR RANGE FILTERS," the entirety of which is expressly incorporated herein by reference.

BACKGROUND

Various types of software applications provide information corresponding to one or more ranges of data. For example, a financial application may allow a user to select a particular range of years for which corresponding data or analysis will be provided. In doing so, the financial application may provide a user interface ("UI") that allows the user to specify the desired range of years. The UI may include a range slider UI control that allows a user to slide one or more range controls to define the boundaries of the desired range. These range slider controls may each be dragged to a specific value, but it may not be clear as to whether or not the specific value associated with the position of each range control is included or excluded from the desired range. Representing the inclusive or exclusive characteristics of the range controls may typically include typing appropriate text into appropriate fields of the UI or using a drop down menu to select inclusion or exclusion. This process of defining inclusion or exclusion of the values associated with the range controls may be cumbersome and time consuming for a user.

It is with respect to these and other considerations that the disclosure made herein is presented.

SUMMARY

Concepts and technologies are described herein for providing a range filter UI having range controls that when selected by a user, switch between exclusive and inclusive modes while altering a corresponding visual treatment of the controls to represent the change. The selectable range controls may each toggle or otherwise switch between inclusive and exclusive modes upon selection by a user to indicate inclusion and exclusion, respectively, of a range value associated with the range control.

According to one aspect of the disclosure, a computer-readable storage medium has computer-executable instructions which, when executed by a computer, cause the computer to receive a selection of a range control associated with a range slider. The range control has a current mode that includes an inclusive mode or an exclusive mode. In an inclusive mode, the value that falls on the location of the range control is included in the selected range. In an exclusive mode, one or more range controls are excluded from the selected range. After determining that the selection of the range control corresponds with a mode change selection, the current mode of the range control is switched between inclusive and exclusive modes, and a visual treatment associated with the range control is modified according to reflect the change in the current mode.

According to another aspect, a computer is provided that receives a static selection of a range control associated with a range slider. The range control has a current mode that is inclusive or exclusive. In response to the static selection of the range control, the current mode is switched between inclusive and exclusive modes, and a visual treatment associated with the range control is modified.

According to yet another aspect, a computer-implemented method is provided for modifying a defined range associated with a range slider having a lower range control and an upper range control. The method includes receiving a static selection of the lower range control or the upper range control. In response to receiving the static selection, the current mode of the selected range control is switched between inclusive and exclusive modes. The defined range is modified to include or exclude a value associated with the selected range control according to the current mode, and a visual treatment associated with the selected range control is modified to reflect the current mode.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
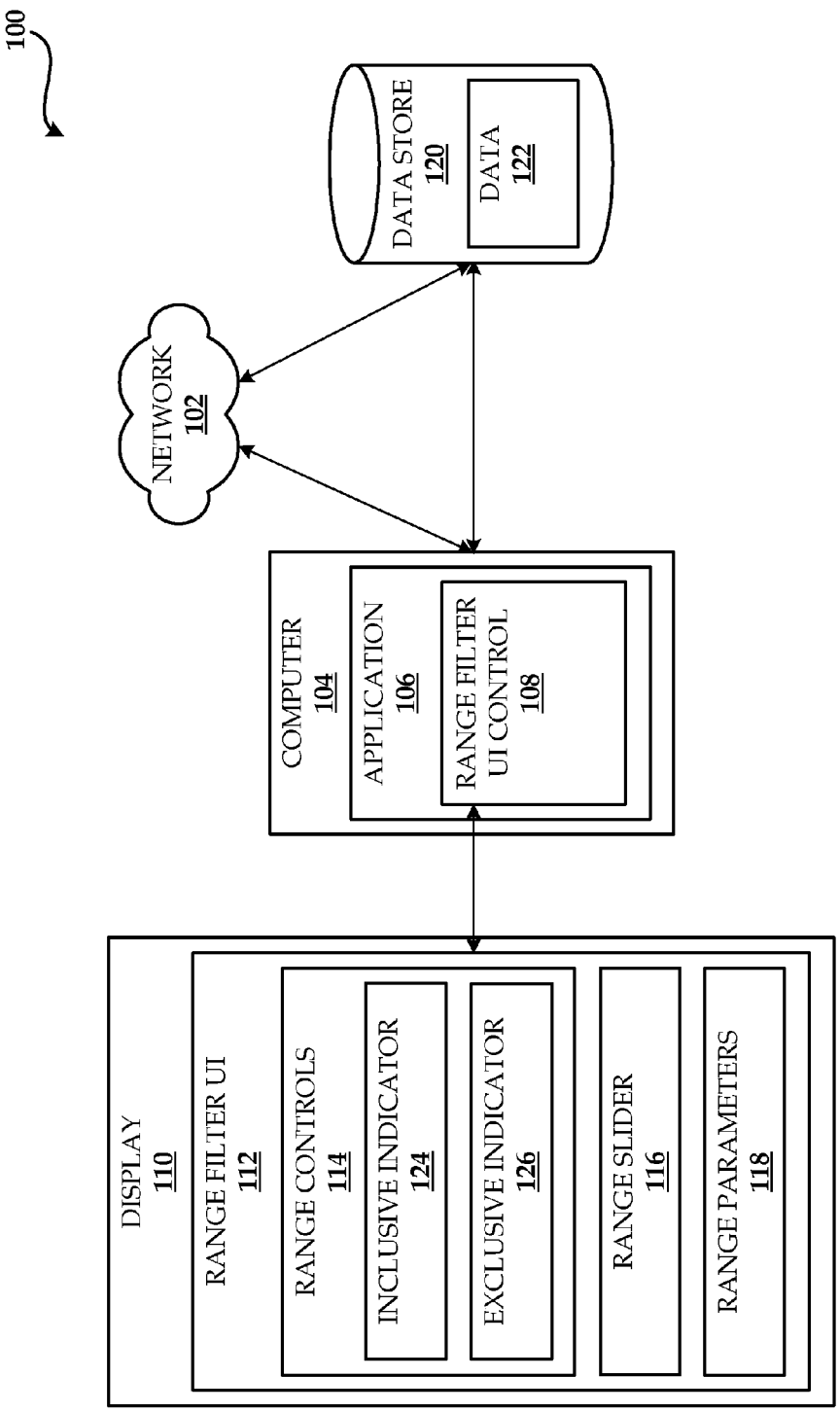
FIG. 1 is a block diagram providing an overview of aspects of the embodiments presented herein.

The following detailed description is directed to concepts and technologies for a range filter UI having range controls that when selected, switch between inclusive and exclusive modes and provide a visual indication of the current mode. As discussed above, conventional UIs for defining a range of values do not provide a clear visual indication as to whether or not a value at an end of the range is included or excluded from the desired range. Moreover, some conventional UIs provide for drop-down menus or textual input for defining whether or not the end value is included or excluded from the desired range, which may be tedious or confusing for a user.

The concepts and technologies described herein enable users to toggle or switch a range control associated with a UI between inclusive and exclusive modes by selecting the range control. This selection may occur via tapping on a range control with a finger if using a touchscreen, or via clicking with a mouse pointer or other mechanism associated with any conventional input device. Doing so may not only switch between inclusive and exclusive modes without a cumbersome drop-down menu or other time consuming steps, but might also provide a visual indication that the change has been made. This visual indication may allow a user to quickly and easily determine whether a value associated with a range control is included within the selected range, or excluded from the range.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for supporting interactions with a range slider having range controls that toggle or switch between inclusive and exclusive modes will be presented.

FIG. 1 is a block diagram providing an overview of the operation of various software components presented herein. According to various embodiments, the system architecture 100 includes a computer 104 with an application 106 executing a range filter UI control 108. As described more particularly herein, the range filter UI control 108 provides a range filter UI 112 on a display 110. The range filter UI 112 allows a user to provide input to the application 106. For example, the user may utilize the range filter UI 112 to define a range of values for use by the application 106.

The range filter UI 112 may include one or more range controls 114, a range slider 116, and range parameters 118. The range slider 116 allows a user to select the desired range of values for use by the application 106 by dragging or otherwise positioning the range controls 114 at desired positions along the range slider 116. The range parameters 118 provide textual information about the selected range. For the purposes of this disclosure, a range slider 116 is a UI element of a range filter UI 112 that enables users to select a continuous range of numbers, values, or other data points by appropriately positioning one or more range controls 114 to define the desired range.

Each range control 114 has a mode indicator used to show the current mode of the range control. Specifically, the range control 114 may include an inclusive indicator 124 or an exclusive indicator 126 to visually indicate the current mode of the range control 114. For example, a range control 114 having an inclusive indicator 124 represents to a user that the range control 114 is in inclusive mode, which means that the value associated with the range control 114 is included within the selected range. Likewise, a range control 114 having an exclusive indicator 126 represents to a user that the range control 114 is in exclusive mode, which means that the value associated with the range control 114 is excluded from the selected range.

Figure 2:
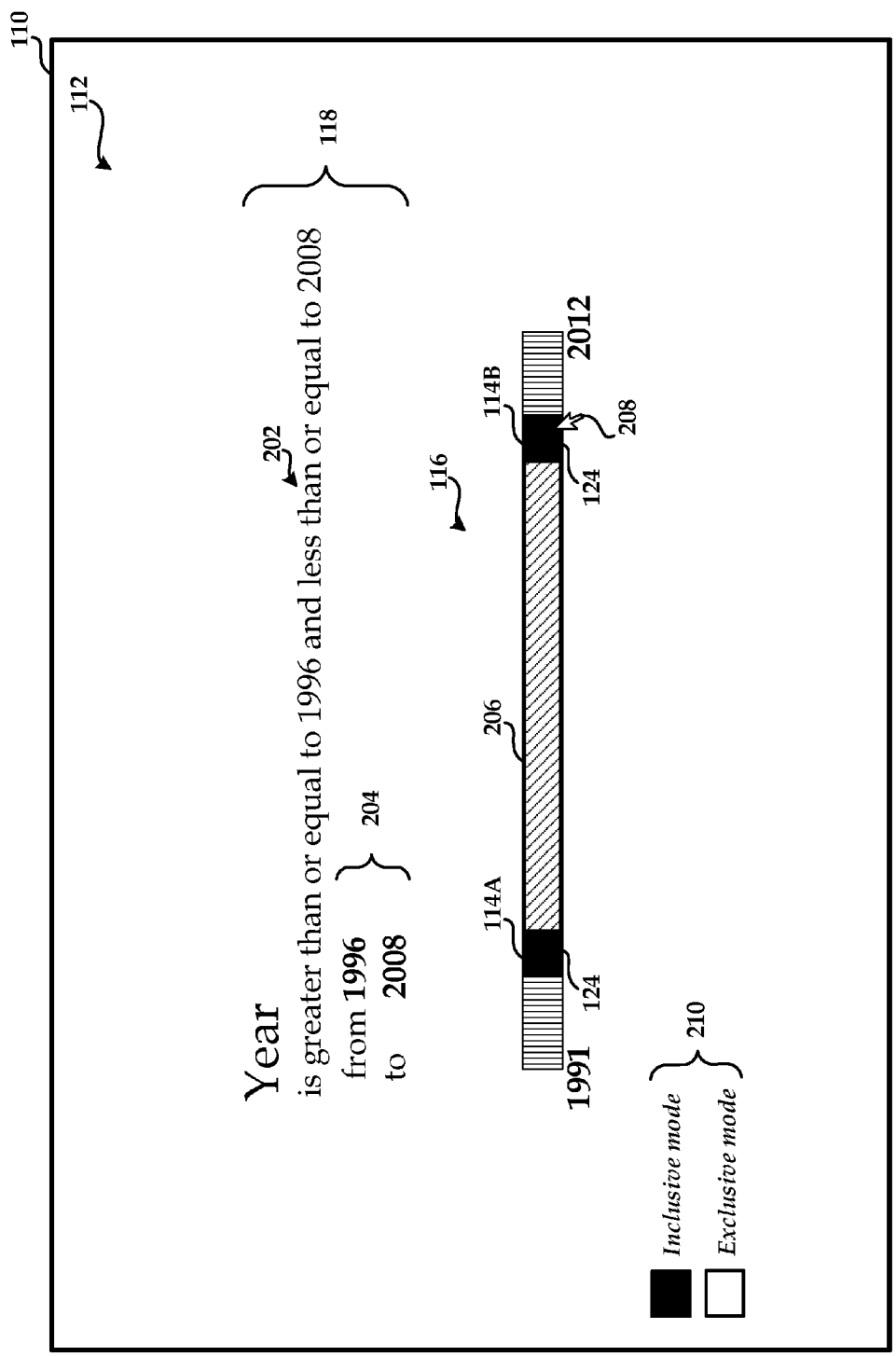
FIG. 2 is a screen diagram showing a range filter UI having a range slider with both range controls configured in an inclusive mode such that both range controls are included in the selected range, in accordance with some embodiments.

The terms inclusive indicator 124 and exclusive indicator 126 are used to describe whether the values corresponding to the range controls are included in the desired range or excluded from the desired range. An inclusive indicator 124 represents those numbers or data points that are "greater/less than or equal to" the number or data point corresponding to the inclusive range control and are included within the defined range 206 (FIG. 2). For example, if an inclusive range control is positioned on the year "2000" in a range of years for a particular chart, then the year 2000 is included within the range of years associated with the range slider for that chart. Similarly, an exclusive indicator 126 represents those numbers or data points that are "greater/less than" the number or data point corresponding to the range control 114. The number or data point corresponding to the range control 114 is not included within the defined range 206 when the exclusive indicator 126 is present. For example, if an exclusive indicator 126 for a range control 114 is positioned on the year "2000", then the year 2000 is not included within the range of years associated with the range slider 116 for that chart. The range controls 114, range slider 116, and range parameters 118 will be described in greater detail below with respect to various examples provided in FIGS. 2-11.

The application 106 may include any type of application or program module utilizing a range filter UI control 108 and corresponding range filter UI 112 to define one or more ranges of values or applicable data, and to perform one or more functions with respect to a defined range 206. In performing this function, the application 106 may receive or retrieve data 122 from a data store 120 via a direct connection or via a network 102, which may be filtered or retrieved according to input provided via the range filter UI 112. The range filter UI 112 receives input from a user via a mouse, track pad, finger, stylus, keyboard, voice or any appropriate input device.

It should be appreciated that the system architecture 100 may include other types of computing devices, including hand-held computers, embedded computer systems, personal digital assistants, and other types of computing devices known to those skilled in the art. It is also contemplated that the system architecture 100 may not include all of the components shown in FIG. 1, may include other components that are not explicitly shown in FIG. 1, or may utilize an architecture completely different than that shown in FIG. 1.

Turning now to FIG. 2, aspects of a range filter UI 112 will now be described according to various embodiments. FIG. 2 shows an example of a display 110 having a range filter UI 112 that provides a user with the ability to define a range of dates for use by an application 106 to filter information associated with the particular implementation. For example, a user may select a date range for a financial application to filter financial data that is being requested by the user. According to this example, and others shown and described herein, multiple information fields may be provided for notifying the user of a selected or desired range of data, for accepting input from the user with respect to the range, or a combination thereof. For example, the range filter UI 112 may include a range slider 116 for selecting a desired range of years between 1991 and 2012, as well as range parameters 118 that provide textual information about the selected range.

The range parameters 118 include a textual range summary 202 that textually describes the current range selection, and range values 204 that indicate the dates or data points associated with a lower range control 114A and an upper range control 114B of the range slider 116. It should be appreciated that the various embodiments are not limited to the configuration of the range filter UI 112 shown and described with respect to the various figures. Rather, any number or type of fields used for collecting or providing data may be provided with the range slider 116 without departing from the scope of this disclosure. For example, the range filter UI control 108 may provide a range filter UI 112 that receives user input via the range slider 116 without displaying the range parameters 118. Alternatively, the range parameters 118 may include more or less information with respect to the textual range summary 202 or the range values 204.

According to the example shown in FIG. 2, the range filter UI 112 provides a range of selectable values that includes all years from 1991 to 2012, as illustrated by the values "1991" and "2012" positioned at the either end of the range slider 116. The defined range 206 illustrates the actual range of values selected. Any data associated with the dates outside of the defined range 206 are filtered from the results associated with the application 106 providing the range filter UI 112. The defined range 206 may be selected by a user using the range controls 114. The range controls 114 may include a lower range control 114A that establishes the lower boundary for the defined range 206, and an upper range control 114B that establishes the upper boundary for the defined range 206. According to other embodiments, the range controls 114 may include a single range control 114 configured as either a lower range control 114A or an upper range control 114B to establish one boundary of the defined range 206, while the other boundary of the defined range 206 remains open or fixed according to the value assigned to the appropriate end of the range slider 116.

To position the range controls 114 and set the defined range 206, a user may select and drag an appropriate range control 114 to a desired value with a cursor 208 or other appropriate input device. Alternatively, the user may select the range slider 116 at a desired value for a range control 114 and the range control 114 will move to that position. According to yet another alternative, the user may enter the lower or upper range value into the range values 204 and the appropriate range control 114 will be positioned accordingly along the range slider 116.

As discussed above, the range parameters 118 may include range values 204 that define the boundaries of the defined range 206. The range values 204 correspond to the upper and lower boundaries of the defined range 206. These upper and lower boundaries may be textually described in detail within the textual range summary 202. In this example, the defined range 206 corresponds to the range of years having a lower boundary of 1996 and an upper boundary of 2008, as described by the range values 204. Specifically, the range values 204 indicate that the defined range 206 to be used by the application 106 for data filtering purposes is "from 1996 to 2008."

According to various embodiments, whether or not the specific years 1996 and 2008 are each included within the defined range 206 can be visualized in various ways. First, the textual range summary 202 textually describes whether the value associated with each range control 114 is included or excluded from the defined range 206. The example shown in FIG. 2 shows that the years 1996 and 2008 associated with the lower range control 114A and upper range control 114B, respectively, are both included within the defined range 206. The textual range summary 202 states "greater than or equal to 1996 and less than or equal to 2008" (emphasis added). The terms "or equal to" indicate that the range values 204 corresponding to the lower range control 114A and the upper range control 114B are included in the defined range 206. As discussed above, according to some implementations, the textual range summary 202 and/or the range values 204 may not be displayed. In these implementations, the lower range control 114A and the upper range control 114B may visually depict whether or not the associated range values 204 are included or excluded from the defined range 206.

As discussed briefly above, an inclusive indicator 124 or an exclusive indicator 126 may also be used in conjunction with the range controls 114 for visually depicting whether or not the values associated with the lower and upper boundaries of the defined range 206 are included or excluded from the range. In FIG. 2, the lower range control 114A and the upper range control 114B both include an inclusive indicator 124 to visually represent to the user that both range controls 114 are currently configured in an inclusive mode. As previously stated, the inclusive mode means that the value associated with the range control 114 is included within the defined range 206. Similarly, exclusive mode means that the value associated with the range control 114 is excluded from the defined range 206. Here, the inclusive indicator 124 is displayed on the range filter UI 112 by representing both the range controls 114 as darkly filled in. The inclusive indicator 124 and exclusive indicator 126 may include any visual treatment that may be used to visually represent the inclusive and exclusive modes, respectively. The range filter UI 112 may include a legend 210 to define the visual treatment associated with the inclusive indicator 124 and exclusive indicator 126. For clarity purposes, the examples shown in FIGS. 3-11 do not include the legend 210. Example visual treatments include, but are not limited to, a particular color, shading, pattern, or animation. Text and symbols may also be used as visual treatments to indicate or supplement the indication of inclusive and exclusive modes, as will be described with respect to further examples below.

In FIGS. 2-11, the range slider 116 is horizontally orientated. In other embodiments the orientation could be vertical. Additionally, it is possible for any other applicable orientation in which a range may be selected. For example, the range slider 116 may be oriented at an angle rather than horizontal. Similarly, the range slider 116 may be configured as a circle, pie chart, or concentric circle configuration such that the range controls 114 are configured radially, similar to hour, minute and second hands on a clock. It should be appreciated that the range slider 116 and range parameters 118 of the range filter UI 112 illustrated in FIG. 2 is illustrative of one contemplated embodiment, and therefore should not be construed as being limited to that or any other specific configuration.

A user may utilize an input device, represented in FIG. 2 as a cursor 208, to change the status of a range control 114 between inclusive and exclusive modes. To do so according to various embodiments, the user statically selects the desired range control 114. Static selection of a range control 114 occurs when the user selects the range control 114 without dragging or otherwise moving the range control 114. Once the user statically selects the range control 114, the current mode of the range control 114 will switch between inclusive mode and exclusive modes. It should be appreciated that while the various figures represent the selection of a range control 114 with a cursor 208 associated with a computer mouse or track pad, any type of input device may be used without departing from the scope of this disclosure.

Figure 3:
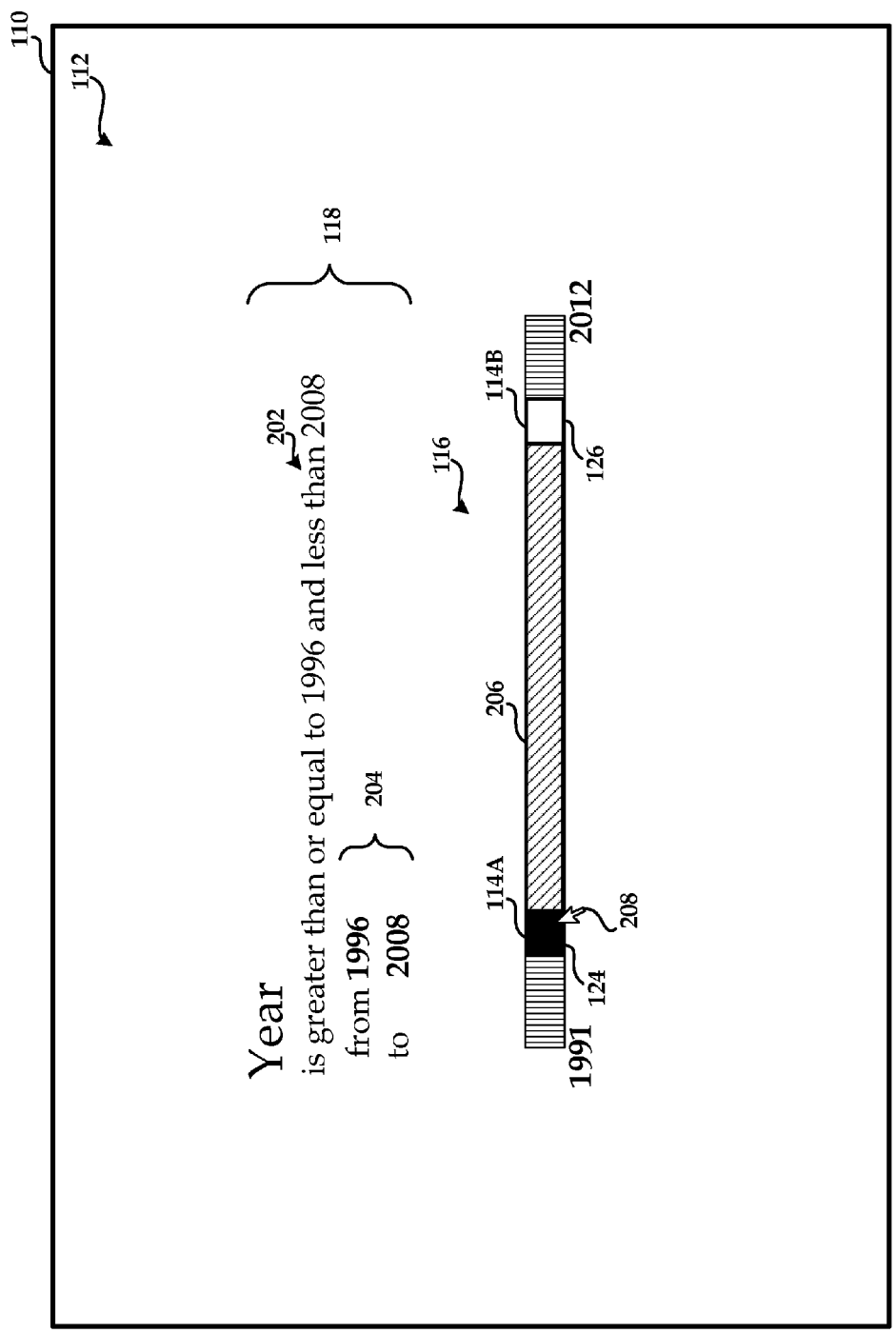
FIG. 3 is a screen diagram showing a range filter UI having a range slider with lower range control configured in an inclusive mode such that the lower range control is included in the selected range and upper range control configured in an exclusive mode such that the upper range control is excluded from the selected range, in accordance with some embodiments.

As an example of a static selection of a range control 114 and corresponding switch between inclusive and exclusive modes, FIG. 2 shows the cursor 208 placed over the upper range control 114B. The upper range control 114B is currently configured in inclusive mode, as represented by the inclusive indicator 124. However, upon static selection of the upper range control 114B, the inclusive indicator 124 changes to an exclusive indicator 126 as shown in FIG. 3. According to the example shown in FIG. 3, the exclusive indicator 126 associated with the upper range control 114B is filled in with a white color. As stated above, any visual treatment may be used to represent the exclusive indicator 126 and corresponding exclusive mode. By statically selecting the upper range control 114B with the cursor 208, its current mode toggled or switched from inclusive mode to exclusive mode as seen by the switch from the inclusive indicator 124 to the exclusive indicator 126. The status of the upper range control 114B can be switched back to inclusive mode by statically selecting it again.

As seen in FIG. 3, according to one embodiment, the textual range summary 202 also indicates the current mode for both range controls 114A and 114B, and changes in response to any change to a value associated with a range control 114, or to the current mode of a range control 114. Here, the textual range summary 202 maintains the terminology "greater than or equal to" when describing the range value 204 (1996) associated with the lower range control 114A with the inclusive indicator 124 since the current mode of the lower range control 114A has not changed. However, the displayed textual range summary 202 reads "less than" when describing the range value 204 (2008) associated with the upper range control 114B with the exclusive indicator 126 in response to the static selection of the upper range control 114B and corresponding switch to the exclusive mode. Accordingly, in this example, the year 1996 is included in the defined range 206, while the year 2008 is not.

Figure 4:
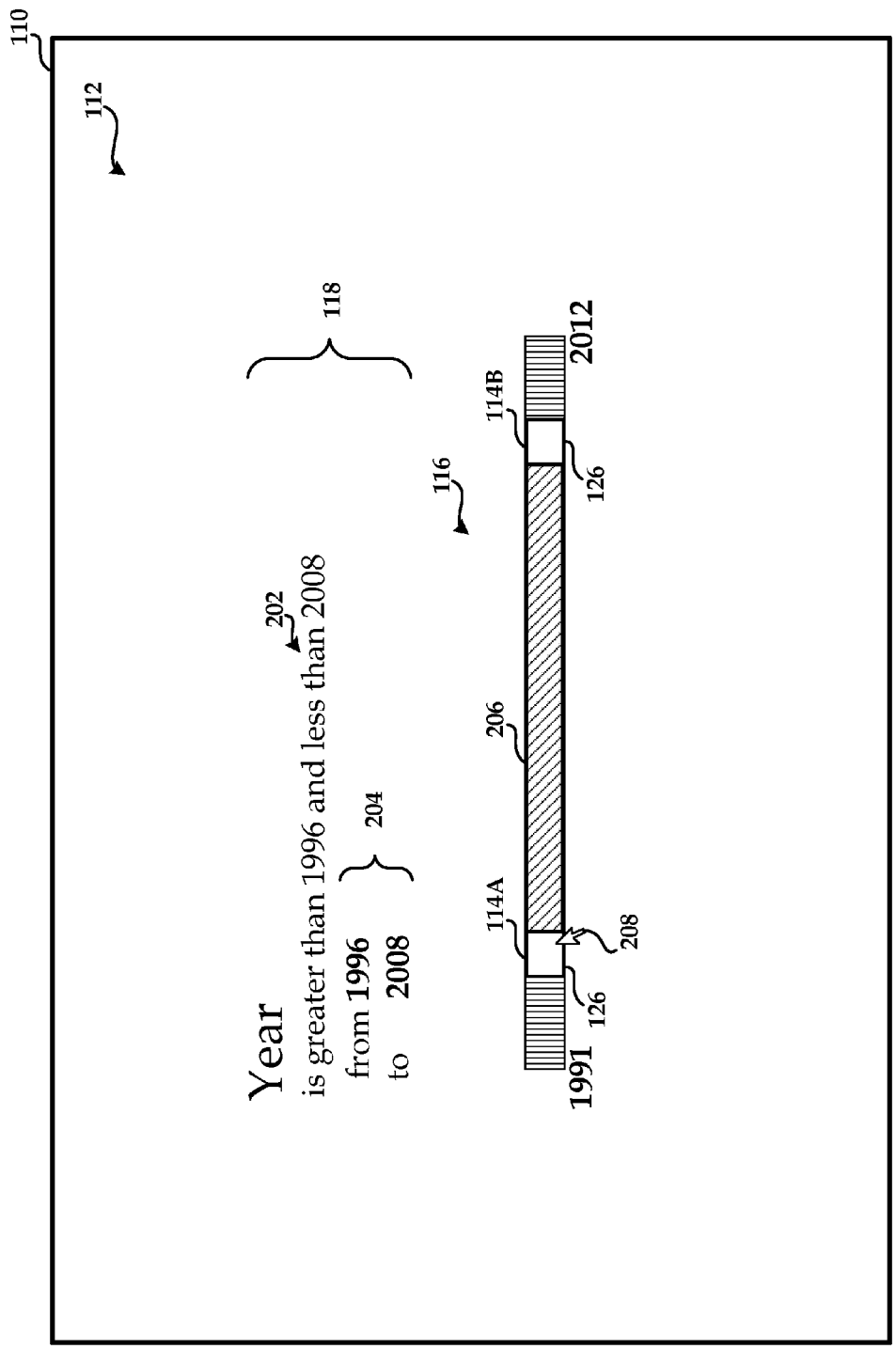
FIG. 4 is a screen diagram showing a range filter UI having a range slider with both range controls configured in an exclusive mode such that both range controls are excluded from the selected range, in accordance with some embodiments.

The range filter UI 112 is shown in FIG. 3 to demonstrate the independent operation of the range controls 114 with respect to one another. The range controls 114 operate independently so that one range control can be configured in inclusive mode, while at the same time, another range control 114 can be configured in exclusive mode. As seen in FIGS. 3 and 4, as the user places the cursor 208 over the lower range control 114A and selects it, the lower range control 114A switches from inclusive mode to exclusive mode. This mode switch is visually represented to the user through the switching from the inclusive indicator 124 associated with the lower range control 114A, shown in FIG. 3, to the exclusive indicator 126 shown in FIG. 4. According to this example, the exclusive indicator 126 associated with the lower range control 114A is filled in with a white color to represent the exclusive mode. However, as stated above, any visual treatment may be used to represent the exclusive indicator 126 and corresponding exclusive mode. If desired, the status of the lower range control 114A can be switched back to inclusive mode by statically selecting it again. It should again be noted that upon selecting the lower range control 114A to switch it to exclusive mode, the textual range summary 202 changed accordingly.

Figure 5:
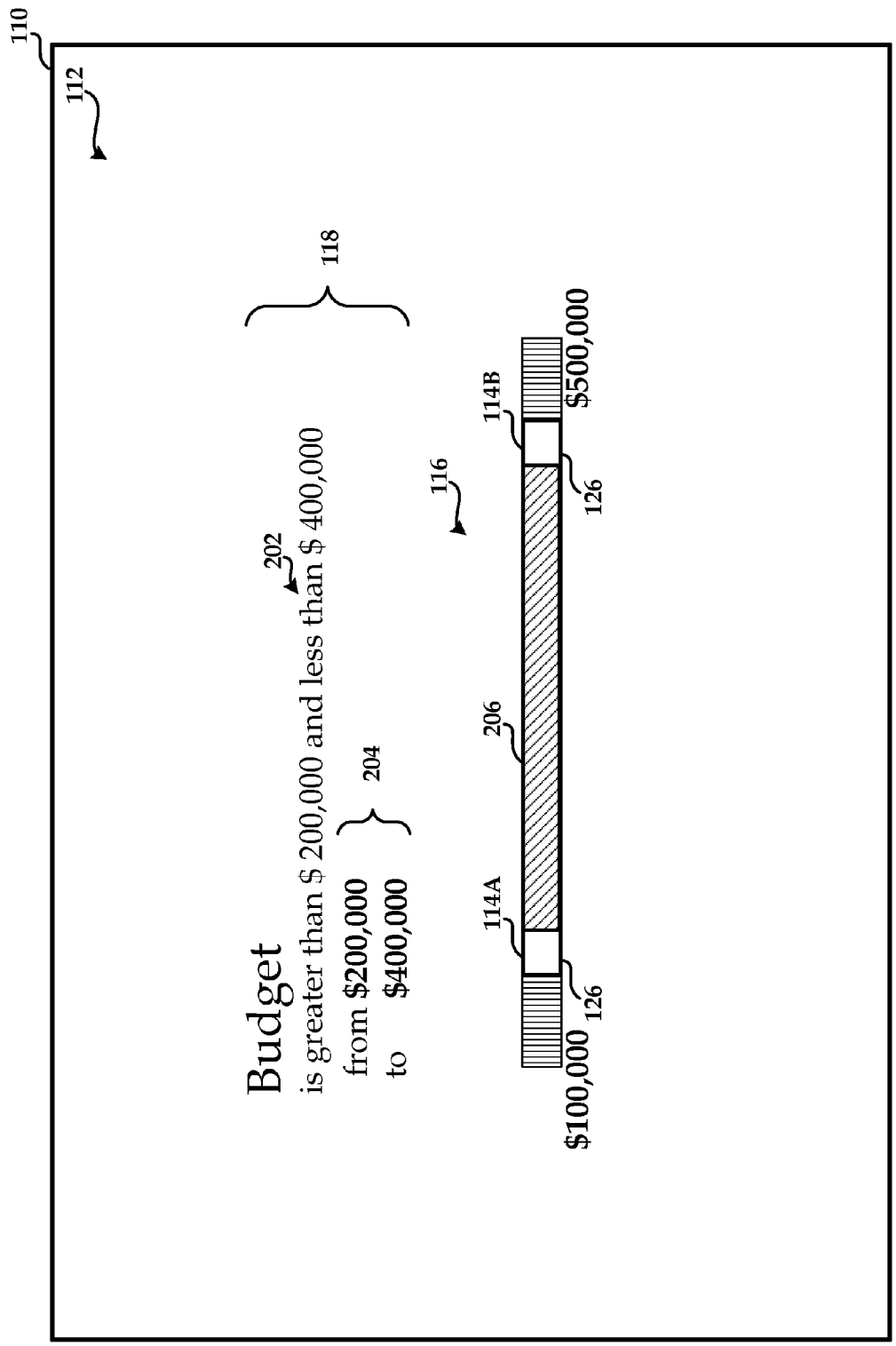
FIG. 5 is a screen diagram showing a range filter UI having a range slider representing monetary values with both range controls configured in an exclusive mode such that both range controls are excluded from the selected range, in accordance with some embodiments.
Figure 6:
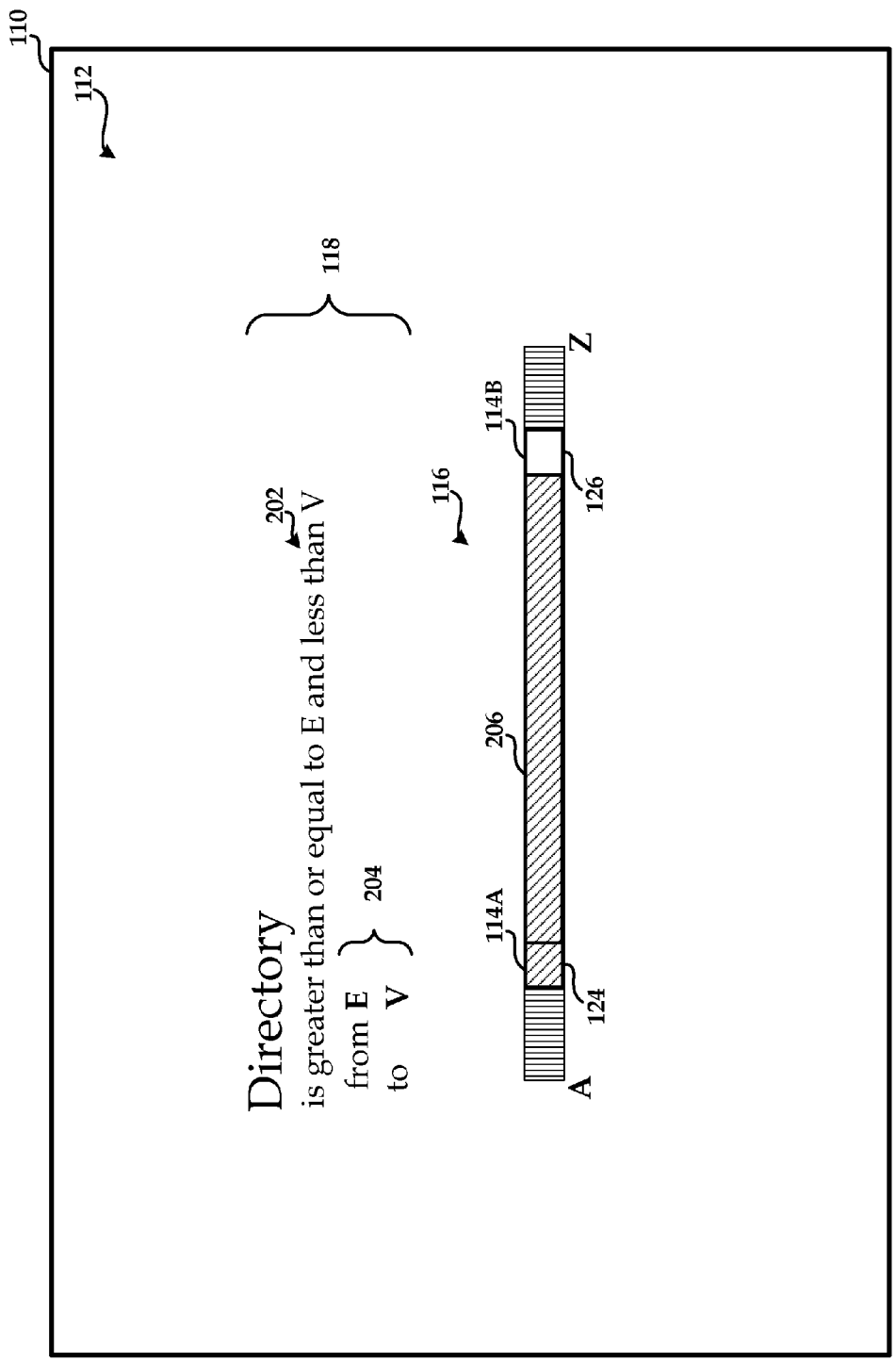
FIG. 6 is a screen diagram showing a range filter UI having a range slider with the lower range control configured in an inclusive mode and the upper range control configured in an exclusive mode, in accordance with some embodiments.

Turning now to FIGS. 5 and 6, these examples demonstrate that the range filter UI 112 may be utilized to define a range of any type of values for use by the application 106, and is not limited to dates or any other specific data. FIG. 5 corresponds to defining a range of monetary amounts, while FIG. 6 corresponds to letters. FIG. 6 additionally illustrates an alternative embodiment for providing an inclusive indicator 124 associated with the range controls 114. The lower range control 114A of this example is shown with the inclusive indicator 124 and the upper range control 114B is shown with the exclusive indicator 126.

In previous examples, the inclusive indicator 124 and the exclusive indicator 126 are distinguishable in visual treatment (i.e., color, text, pattern, symbol) not only from each other, but also from the visual treatment of the defined range 206. However, in the embodiment shown in FIG. 6, the lower range control 114A is shaded, colored, or otherwise provided with a visual treatment that matches the visual treatment of the defined range 206. Because the visual treatment associated with the defined range 206 matches the visual treatment of the lower range control 114A, a user may clearly see that the range value 204 associated with the lower range control 114A is inclusive to the defined range 206.

FIGS. 7A-8B show alternative embodiments associated with the inclusive indicators 124 and the exclusive indicators 126 and corresponding visual treatments. According to the examples shown in FIGS. 7A-7B, the range controls 114 are each represented with visual treatments associated with symbols rather than shading. In the example shown in FIG. 7A, the exclusive indicator 126 corresponds to a "greater than" or "less than" symbol associated with the lower range control 114A and the upper range control 114B, respectively. The symbol positioned proximate to the range controls 114 may encompass having the symbol next to, adjacent to, on or otherwise connected to the range controls 114 such that the symbol or value is visually connected with the range control. The symbols proximate to the range controls 114 may be displayed along with the values associated with the range controls 114 to illustrate the values in the defined range 206. For example, the values "10" and "21" are shown proximate to the range controls 114 in FIGS. 7A and 7B.

Figure 7A:
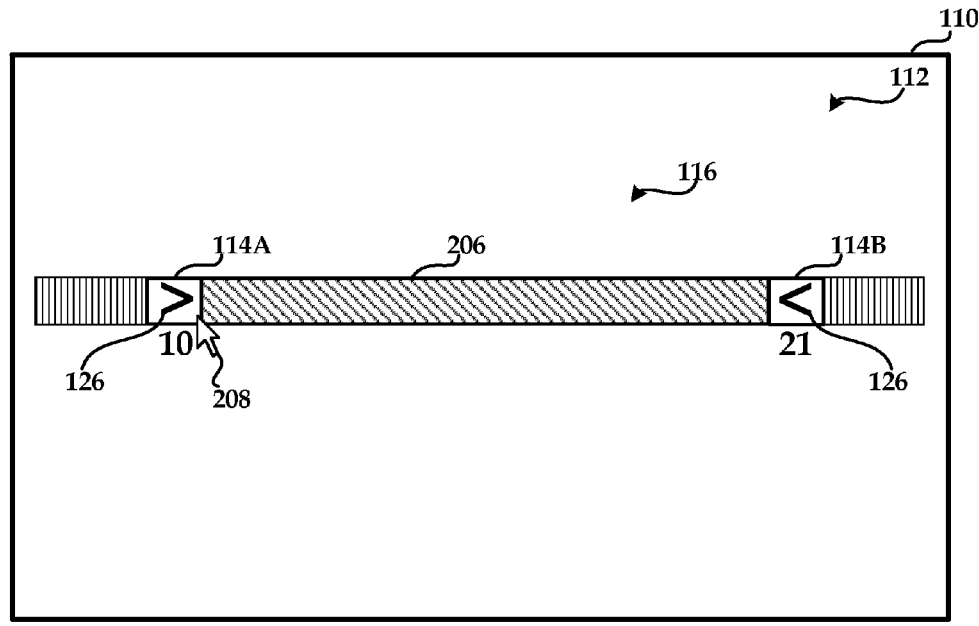
FIG. 7A is a screen diagram showing a range filter UI having a range slider with both range controls configured in an exclusive mode such that both range controls are excluded from the selected range and the range controls showing symbols to depict the exclusive mode configuration, in accordance with some embodiments.
Figure 7B:
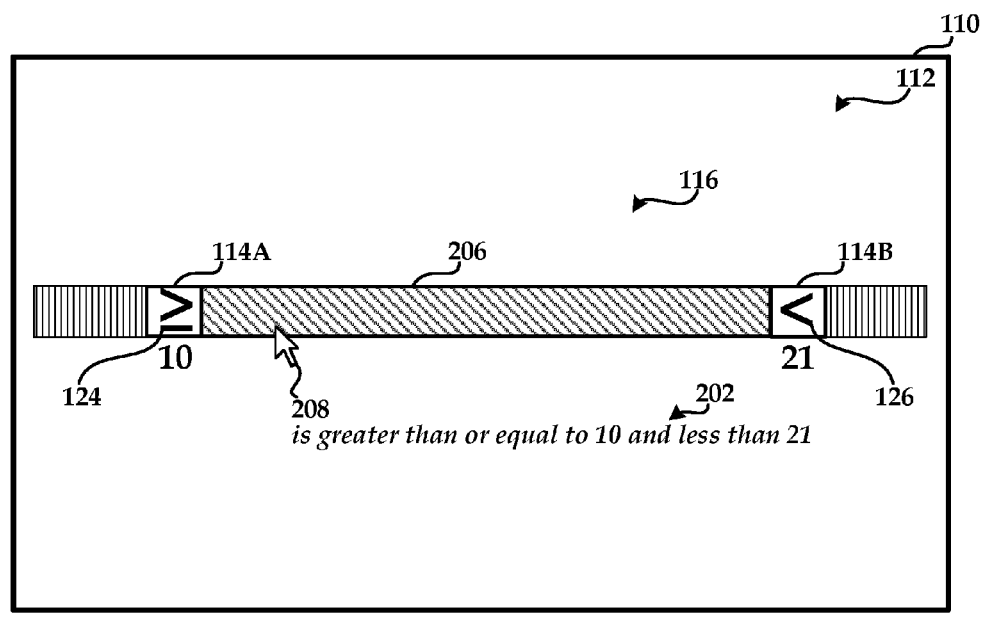
FIG. 7B is a screen diagram showing a range filter UI having a range slider with the lower range control configured in an inclusive mode and the upper range control configured in an exclusive mode and the range controls showing symbols to depict the inclusive and exclusive modes, respectively, in accordance with some embodiments.

FIGS. 7A and 7B also illustrate embodiments in which the range filter UI 112 provides the range slider 116, but does not include the textual range summary 202 and the range values 204 shown and described above with respect to FIGS. 2-6. Visually indicating inclusion or exclusion utilizing the range controls 114 without other fields may be useful in a variety of applications where the display area is limited or a simplified UI is desired. Applications where display area might be limit may include mobile applications and tablet applications, among others. Various other embodiments may include hover information to display additional information when a cursor 208 hovers over a selected area, as shown in FIG. 7B. The hover information may include information as to what each field is, how to manipulate the various fields, the values for the various fields or other similar information. In this example, as the cursor 208 hovers over the range slider 116, the textual range summary 202 appears to textually describe the defined range 206.

As another example of a static selection of a range control 114 and corresponding switch between inclusive and exclusive modes, FIG. 7A shows the cursor 208 placed over the lower range control 114A. Upon static selection of the lower range control 114A, the exclusive indicator 126 changes to an inclusive indicator 124 as shown in FIG. 7B. As stated above, any visual treatment may be used to represent the inclusive indicator 124 and the exclusive indicator 126. In FIG. 7B, the "greater than or equal to" symbol is used to represent the inclusive indicator 124 for the lower range control 114A.

Figure 8A:
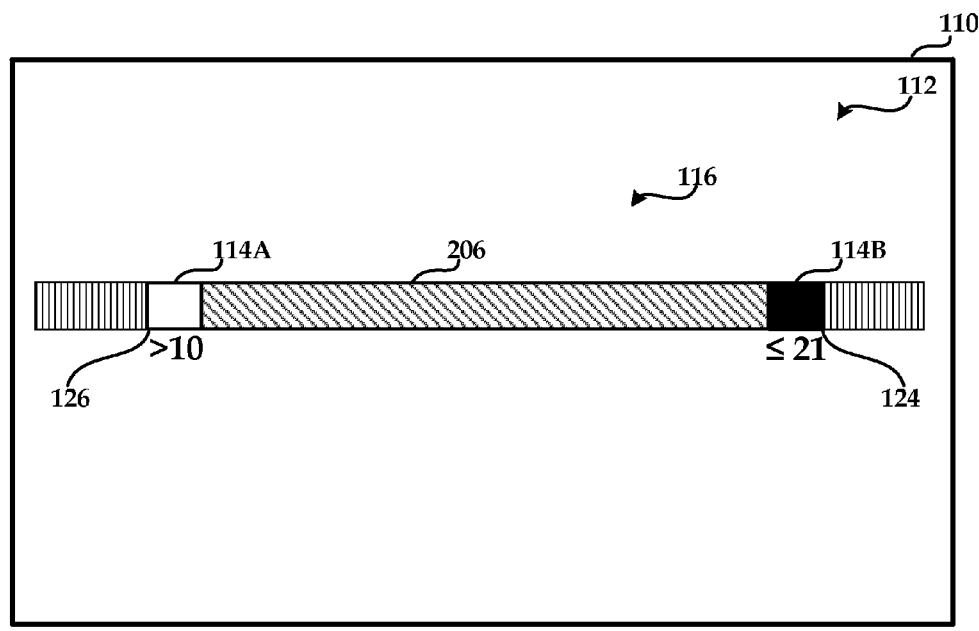
FIG. 8A is a screen diagram showing a range filter UI having a range slider with the lower range control configured in an exclusive mode and the upper range control configured in an inclusive mode and showing symbols beneath the range controls to depict the inclusive and exclusive modes, in accordance with some embodiments.
Figure 8B:
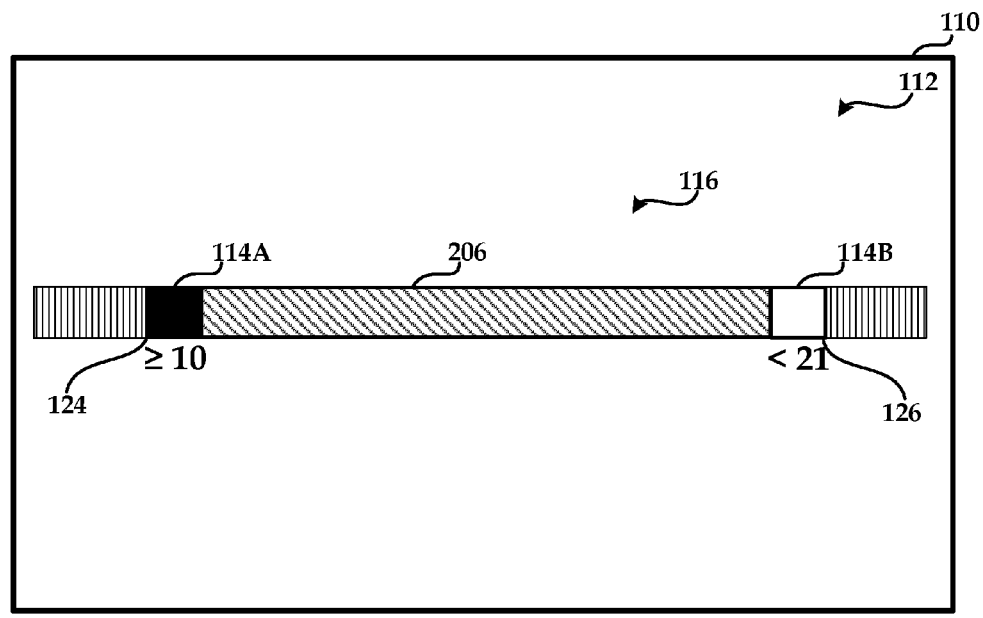
FIG. 8B is a screen diagram showing a range filter UI having a range slider with the lower range control configured in an inclusive mode and the upper range control configured in an exclusive mode and showing symbols beneath the range controls to depict the inclusive and exclusive modes, in accordance with some embodiments.

FIGS. 8A and 8B illustrate embodiments in which the visual treatments of the inclusive indicator 124 and the exclusive indicator 126 may include color, shading, pattern, or the like with respect to the corresponding range controls 114, as well as a corresponding symbol and text positioned proximate to the range controls 114. For example, in FIG. 8A, the lower range control 114A is represented with an exclusive indicator 126 having white or other visual treatment associated with the exclusive mode, along with a "greater than" sign and the value "10" to further indicate that the lower value of the defined range 206 is "10," but the exact value of "10" is not included in the range. FIG. 8B demonstrates the switching of the current mode and corresponding indicators of each of the lower range control 114A and the upper range control 114B of FIG. 8A upon selection of the range controls 114.

Figure 9:
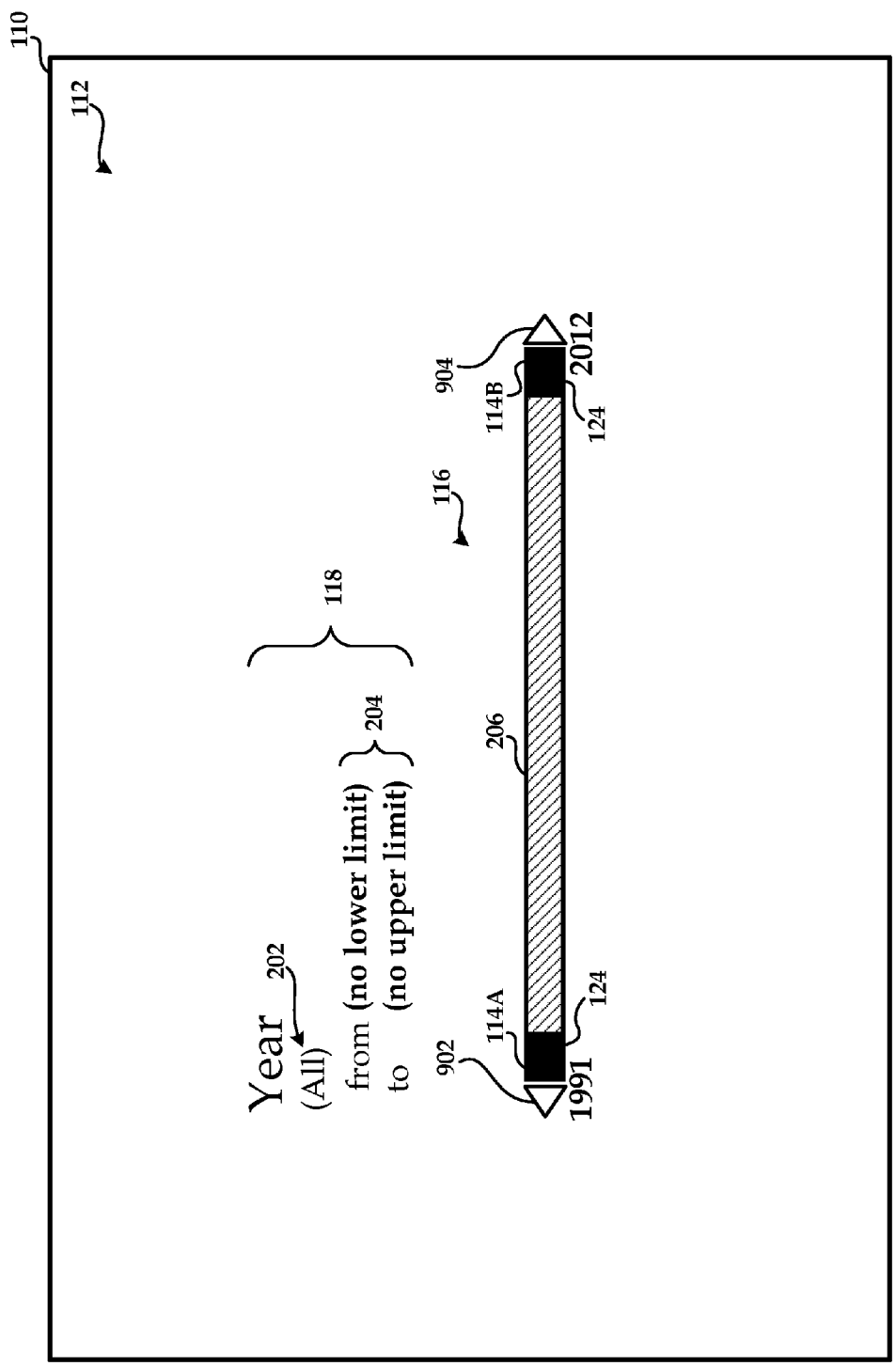
FIG. 9 is a screen diagram showing a range filter UI having a range slider with both range controls configured in an inclusive mode and the selected range being extended so there are no lower or upper limits, in accordance with some embodiments.

FIG. 9 shows an embodiment of a range filter UI 112 in which the defined range 206 may extend beyond the range of selectable values displayed by the range slider 116. A lower limit arrow 902 and an upper limit arrow 904 may allow for an extension of the defined range 206 beyond the range of selectable values. The range values 204 indicate that the defined range 206 contains no lower or upper limits. The textual range summary 202 also indicates that the defined range 206 contains no lower or upper limits. Various embodiments, may have the defined range 206 extend to have no lower or upper limits by moving the range control 114 proximate to the end of the range of selectable values or by statically selecting the lower limit arrow 902 and/or the upper limit arrow 904. In this embodiment, the lower range control 114A and upper range control 114B are filled in with a dark color to demonstrate the inclusive indicator 124.

According to one embodiment, the lower limit arrow 902 and the upper limit arrow 904 may be considered an extension of the range controls 114 such that static selection of the lower limit arrow 902 or the upper limit arrow 904 may change the current mode of the corresponding range control 114. For example, by statically selecting the upper limit arrow 904 in FIG. 9, the upper range control 114B could switch to exclusive mode with the inclusive indicator 124 being replaced by an exclusive indicator 126. Although the lower limit arrow 902 and the upper limit arrow 904 are displayed when there is no lower or upper limit according to the example shown in FIG. 9, according to other embodiments, the arrows may be displayed where an upper and/or lower limit exists.

Figure 10:
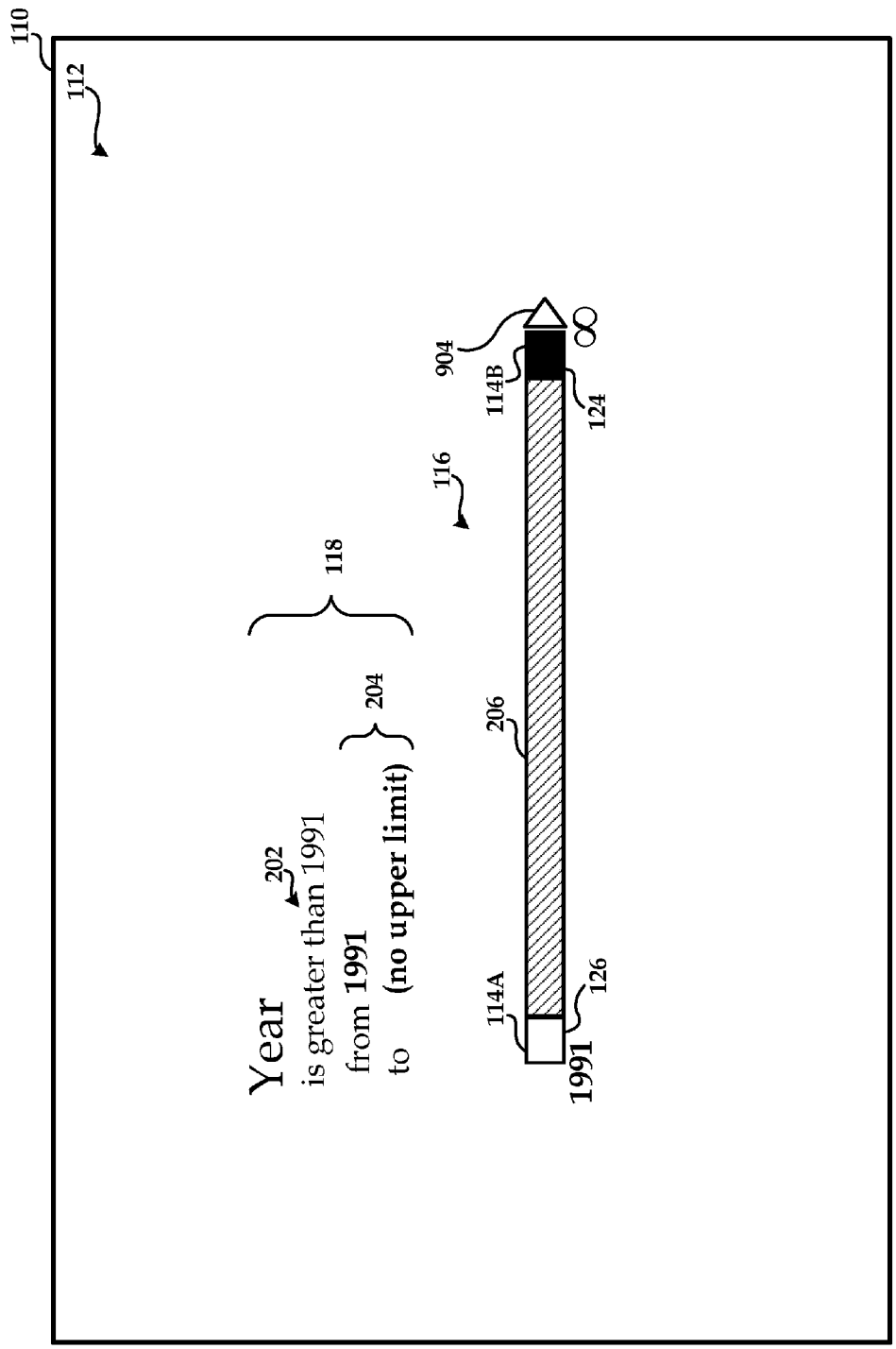
FIG. 10 is a screen diagram showing a range filter UI having a range slider with the lower range control configured in an exclusive mode and the upper range control configured in an inclusive mode and the selected range being extended so there is no upper limit, in accordance with some embodiments.
Figure 11:
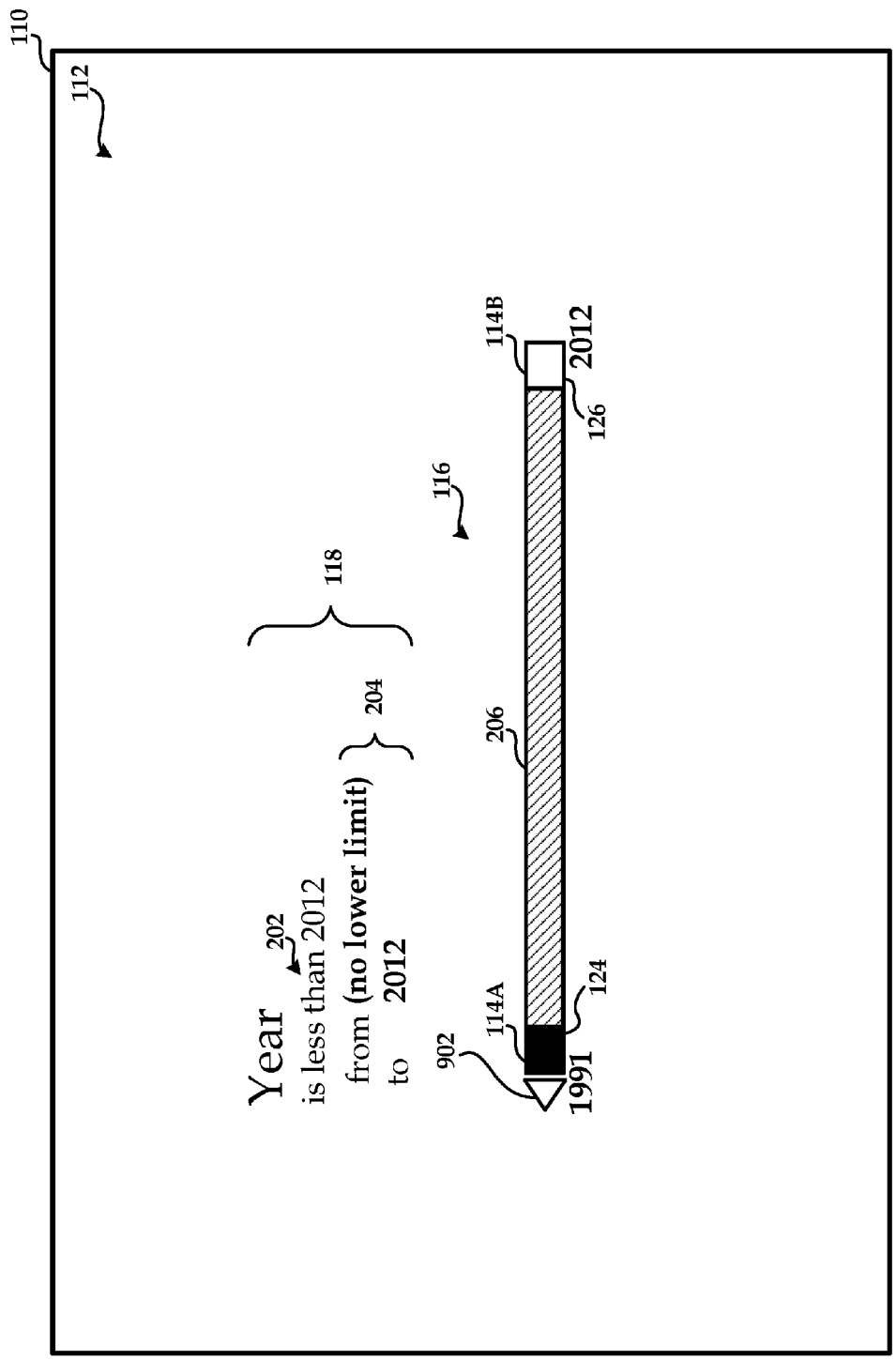
FIG. 11 is a screen diagram showing a range filter UI having a range slider with the lower range control configured in an inclusive mode and the upper range control configured in an exclusive mode and the selected range being extended so there is no lower limit, in accordance with some embodiments.

FIGS. 10 and 11 show examples of a range filter UI 112 utilizing upper and lower limit arrows, respectively. FIG. 10 illustrates having an upper limit arrow 904 without a lower limit arrow 902. The textual range summary 202 indicates that the defined range 206 contains a lower limit, but does not contain an upper limit. The ending range value illustrates that there is no upper limit by showing the infinity symbol (∞) instead of the selectable range value, as in FIG. 9. Similarly in FIG. 11, the range filter UI 112 includes a lower limit arrow 902 without the use of an upper limit arrow 904. It should be understood that any combination of the inclusive and exclusive indicators and visual treatments described herein may be utilized in any single implementation without departing from the scope of this disclosure. According to all embodiments, the range filter UI 112 provides a visual indication of the current mode of one or more range control 114, which can be changed via a single static selection of the range control 114 or corresponding element.

Figure 12:
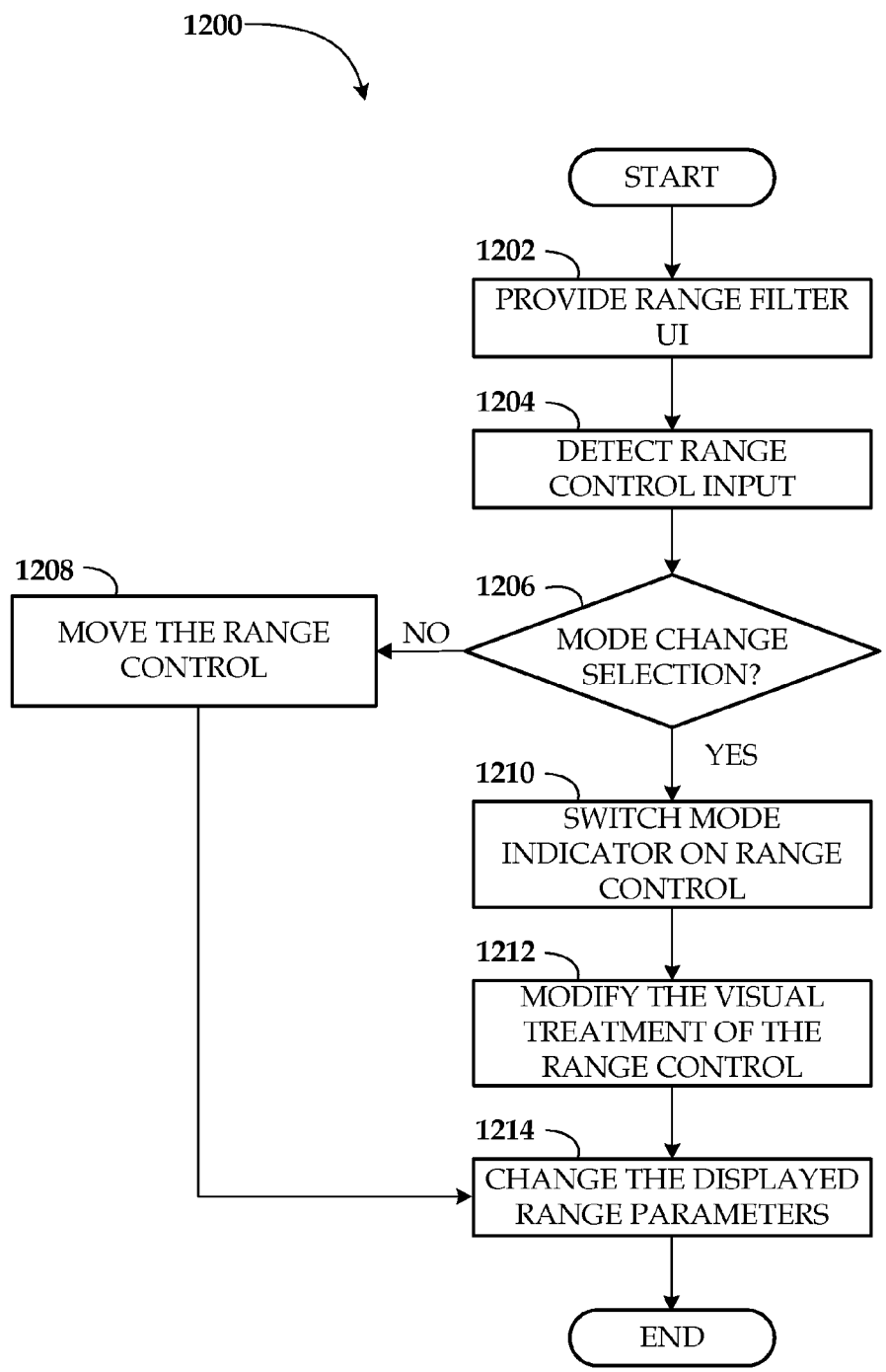
FIG. 12 is a flow diagram showing aspects of a method for selectively toggling range slider range controls between inclusive and exclusive modes, in accordance with some embodiments.

Turning now to FIG. 12, aspects of a routine 1200 for selectively toggling or switching the current mode of the range controls 114 between inclusive and exclusive modes will be described, according to an illustrative embodiment. It should be understood that the operations of the routine 1200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated routine 1200 can be ended at any time and need not be performed in its entirety. Some or all operations of the routine 1200, and/or substantially equivalent operations, can be performed by execution of computer-readable instructions included on a computer-storage media, as defined herein. For purposes of the claims, the phrase "computer storage medium" and variations thereof, does not include waves, signals, and/or other transitory and/or intangible communication media, per se. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof Routine 1200 begins at operation 1202, wherein the range filter UI 112 is provided to an end user via a display 110. At operation 1204, the application 106 detects user input associated with a range control 114 of the range slider 116. According to various implementations, the input detected in operation 1204 includes, but is not necessarily limited to, a touch detected at a touch-sensitive display or other input device such as a touchpad, a multi-touch input detected at a multi-touch sensitive display or other input device, a mouse button click, a text string or key stroke entry, a voice command, or other type of input.

From operation 1204, the routine 1200 proceeds to operation 1206, wherein the application 106 determines if the input detected in operation 1204 corresponds to a mode change selection of the range control 114. As explained above, the range slider 116 can present various options and/or UI controls for changing the defined range 206 and the current mode of the range controls 114 to visually indicate whether the end value is included or excluded from the defined range 206. Accordingly, at operation 1206, the application 106 determines whether the received input is a static selection of the lower range control 114A and/or the upper range control 114B, or a movement of one or more of the range controls. If the application determines in operation 1206 that a range control 114 is being moved rather than statically selected, then the routine 1200 proceeds to operation 1208, where the application 106 moves the appropriate range control 114 to alter the defined range 206 according to the user input. From operation 1208, routine 1200 proceeds to operation 1214 where the range parameters 118 are updated to reflect the changes to the defined range 206.

However, if the application 106 determines in operation 1206, that the user input comprises a static selection of a range control 114, than the routine 1200 continues to operation 1210, where the application 106 changes the current mode of the appropriate range control 114, as well as the corresponding mode indicator, such as the inclusive indicator 124 or the exclusive indicator 126. For example, if the range control 114 has in inclusive mode than operation 1210 will change the current mode to exclusive mode. Likewise, if the range control 114 is in exclusive mode than operation 1210 will switch the current mode to inclusive mode.

From operation 1210, routine 1200 proceeds to operation 1212 wherein the range control 114 is modified according to the appropriate visual treatment associated with the inclusive indicator 124 or exclusive indicator 126. As discussed above, the visual treatment associated with any particular mode indicator may include a color, shading, pattern, animation, symbol, text, or any other visually identifiable indicia. At operation 1214, the range parameters 118 are updated to reflect the mode changes and/or the changes to the defined range 206, and the routine 1200 ends. Change to the range parameters 118 may include changing the textual range summary 202 between "greater than" and "greater than or equal to" or changing between "less than" and "less than or equal to." Changing the range parameters 118 may also include changing the range values 204. The range values 204 may change because a range control 114 moved or because an upper or lower limit was removed.

Figure 13:
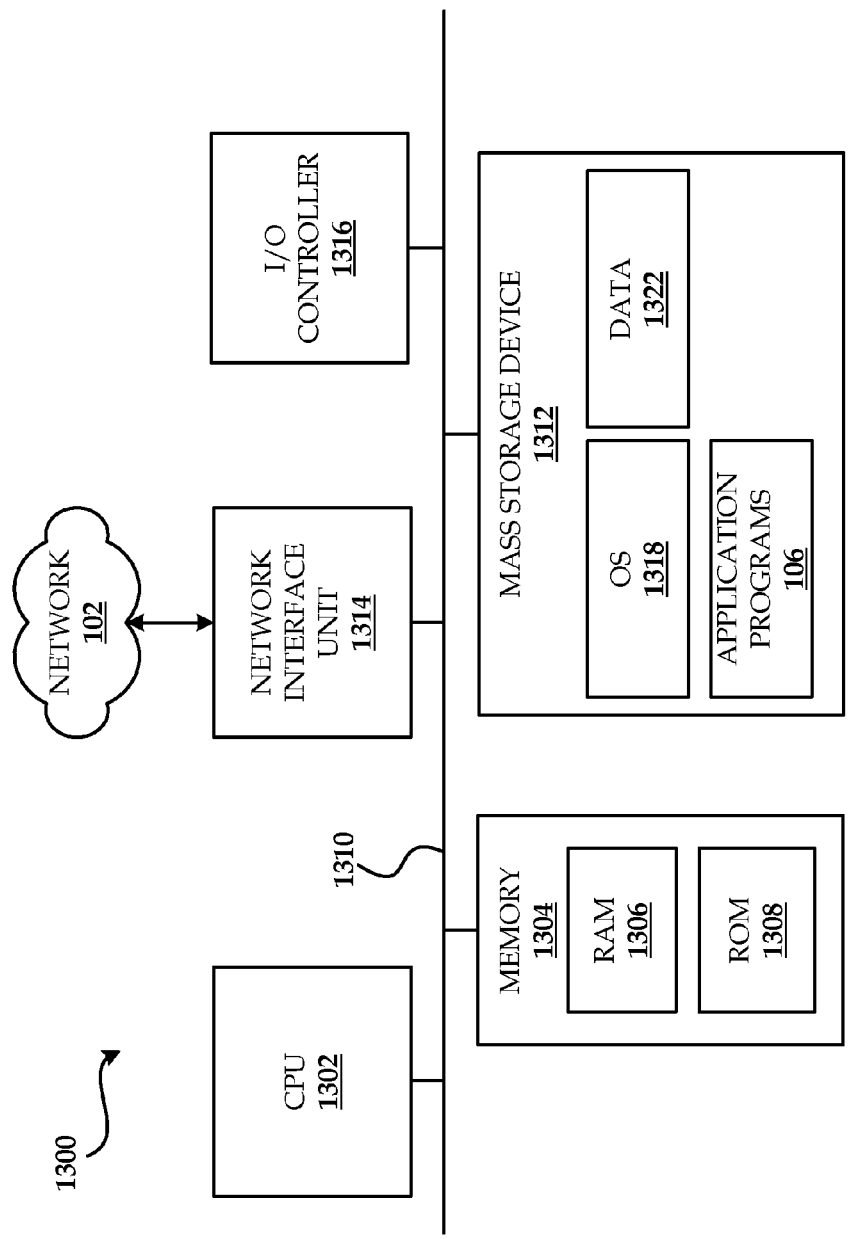
FIG. 13 is a computer architecture diagram illustrating an illustrative computer hardware and software architecture for a computing system capable of implementing aspects of the embodiments presented herein.

FIG. 13 illustrates an illustrative computer architecture 1300 for a device capable of executing the software components described herein for supporting interactions with a range slider 116 having range controls 114 that selectively switch the current mode between inclusive and exclusive modes. Thus, the computer architecture 1300 illustrated in FIG. 13 illustrates an architecture for a server computer, a mobile phone, a PDA, a smart phone, a desktop computer, a netbook computer, a tablet computer, and/or a laptop computer. The computer architecture 1300 may be utilized to execute any aspects of the software components presented herein.

The computer architecture 1300 illustrated in FIG. 13 includes a central processing unit 1302 ("CPU"), a system memory 1304, including a random access memory 1306 ("RAM") and a read-only memory ("ROM") 1308, and a system bus 1310 that couples the memory 1304 to the CPU 1302. A basic input/output system containing the basic routines that help to transfer information between elements within the computer architecture 1300, such as during startup, is stored in the ROM 1308. The computer architecture 1300 further includes a mass storage device 1312 for storing the operating system 1318 and the application programs 106. The mass storage device 1312 also can be configured to store the data 1322.

The mass storage device 1312 is connected to the CPU 1302 through a mass storage controller (not shown) connected to the bus 1310. The mass storage device 1312 and its associated computer-readable media provide non-volatile storage for the computer architecture 1300. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1300. For purposes of the claims, the phrase "computer storage medium" and variations thereof, does not include waves, signals, and/or other transitory and/or intangible communication media, per se.

According to various embodiments, the computer architecture 1300 may operate in a networked environment using logical connections to remote computers through a network such as the network 102. The computer architecture 1300 may connect to the network 102 through a network interface unit 1314 connected to the bus 1310. It should be appreciated that the network interface unit 1314 also may be utilized to connect to other types of networks and remote computer systems. The computer architecture 1300 also may include an input/output controller 1316 for receiving and processing input from a number of other devices, including a keyboard, mouse, or electronic stylus (not shown in FIG. 13). Similarly, the input/output controller 1316 may provide output to a display screen, a printer, or other type of output device (also not shown in FIG. 13).

It should be appreciated that the software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing devices, including hand-held computers, embedded computer systems, personal digital assistants, and other types of computing devices known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

Figure 14:
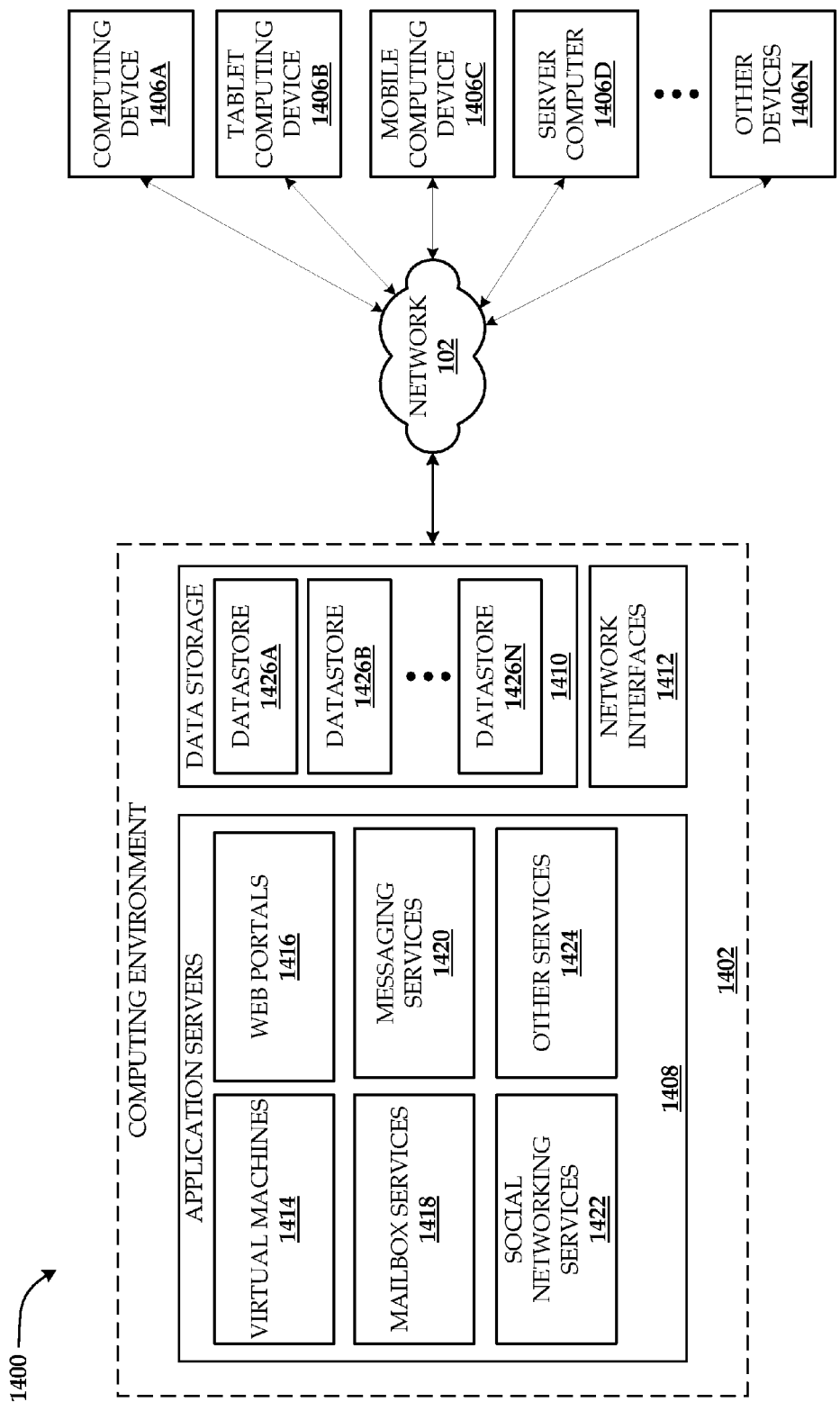
FIG. 14 is a diagram illustrating a distributed computing environment capable of implementing aspects of the embodiments presented herein.

FIG. 14 illustrates an illustrative distributed computing environment 1400 capable of executing the software components described herein for supporting interactions with a range slider 116 having range controls 114 that selectively switch the current mode between inclusive and exclusive modes. The distributed computing environment 1400 thus may be utilized to execute any aspects of the software components presented herein.

According to various implementations, the distributed computing environment 1400 includes a computing environment 1402 operating on, in communication with, or as part of the network 102. The network 102 also can include various access networks. According to various implementations, the functionality of the network 102 is provided by the network 102 illustrated in FIG. 1. One or more client devices 1406A-1406N (hereinafter referred to collectively and/or generically as "clients 1406") can communicate with the computing environment 1402 via the network 102 and/or other connections (not illustrated in FIG. 14). In the illustrated embodiment, the clients 1406 include a computing device 1406A such as a laptop computer, a desktop computer, or other computing device; a slate or tablet computing device ("tablet computing device") 1406B; a mobile computing device 1406C such as a mobile telephone, a smart phone, or other mobile computing device; a server computer 1406D; and/or other devices 1406N. It should be understood that any number of clients 1406 can communicate with the computing environment 1402. Two example computing architectures for the clients 1406 are illustrated and described herein with reference to FIGS. 13 and 15. It should be understood that the illustrated clients 1406 and computing architectures illustrated and described herein are illustrative, and should not be construed as being limited in any way.

In the illustrated embodiment, the computing environment 1402 includes application servers 1408, data storage 1410, and one or more network interfaces 1412. According to various implementations, the functionality of the application servers 1408 can be provided by one or more server computers that are executing as part of, or in communication with, the network 102. The application servers 1408 can host various services, virtual machines, portals, and/or other resources. In the illustrated embodiment, the application servers 1408 host one or more virtual machines 1414 for hosting applications or other functionality. According to various implementations, the virtual machines 1414 host one or more applications and/or software modules for providing the functionality described herein for supporting interactions with a range slider having range controls that toggle between inclusive and exclusive modes. It should be understood that this embodiment is illustrative, and should not be construed as being limiting in any way.

The application servers 1408 also host or provide access to one or more Web portals, link pages, Web sites, and/or other information ("Web portals") 1416.

According to various implementations, the application servers 1408 also include one or more mailbox services 1418 and one or more messaging services 1420. The mailbox services 1418 can include electronic mail ("email") services. The mailbox services 1418 also can include various personal information management ("PIM") services including, but not limited to, calendar services, contact management services, collaboration services, and/or other services. The messaging services 1420 can include, but are not limited to, instant messaging services, chat services, forum services, and/or other communication services.

As shown in FIG. 14, the application servers 1408 also can host other services, applications, portals, and/or other resources ("other resources") 1424. It thus can be appreciated that the computing environment 1402 can provide integration of the concepts and technologies disclosed herein provided herein for supporting interactions with a range slider having range controls that toggle between inclusive and exclusive modes with various mailboxes, messaging, social networking, and/or other services or resources. For example, the concepts and technologies disclosed herein can provide a range slider with range controls that toggle between inclusive and exclusive modes for interacting with social networking services 1422, mail services, messaging services, and/or other services or applications.

As mentioned above, the computing environment 1402 can include the data storage 1410. According to various implementations, the functionality of the data storage 1410 is provided by one or more databases operating on, or in communication with, the network 102. The functionality of the data storage 1410 also can be provided by one or more server computers configured to host data for the computing environment 1402. The data storage 1410 can include, host, or provide one or more real or virtual datastores 1426A-1426N (hereinafter referred to collectively and/or generically as "datastores 1426"). The datastores 1426 are configured to host data used or created by the application servers 1408 and/or other data. Although not illustrated in FIG. 14, the datastores 1426 also can host or store the data 1322 shown in FIG. 13, if desired.

The computing environment 1402 can communicate with, or be accessed by, the network interfaces 1412. The network interfaces 1412 can include various types of network hardware and software for supporting communications between two or more computing devices including, but not limited to, the clients 1406 and the application servers 1408. It should be appreciated that the network interfaces 1412 also may be utilized to connect to other types of networks and/or computer systems.

It should be understood that the distributed computing environment 1400 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1400 provides the software functionality described herein as a service to the clients 1406. It should be understood that the clients 1406 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1400 to utilize the functionality described herein for a range slider with range controls that toggle between inclusive and exclusive modes.

Figure 15:
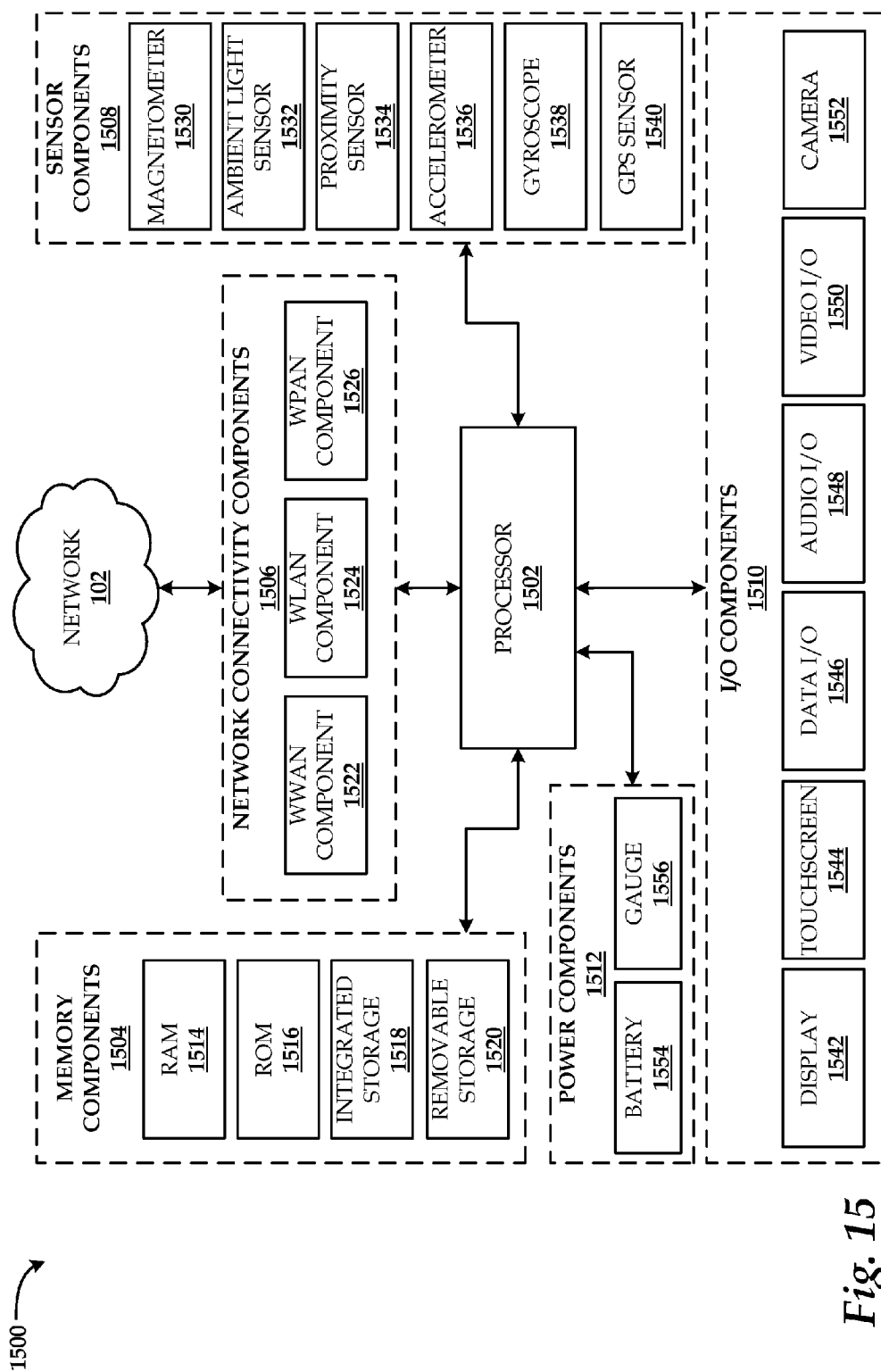
FIG. 15 is a computer architecture diagram illustrating a computing device architecture capable of implementing aspects of the embodiments presented herein.

Turning now to FIG. 15, an illustrative computing device architecture 1500 is shown for a computing device that is capable of executing various software components described herein for providing a range slider with range controls that selectively switch the current mode between inclusive and exclusive modes. The computing device architecture 1500 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 1500 is applicable to any of the clients 1406 shown in FIG. 14. Furthermore, aspects of the computing device architecture 1500 may be applicable to traditional desktop computers, portable computers (e.g., laptops, notebooks, ultra-portables, and netbooks), server computers, and other computer systems, such as described herein with reference to FIG. 13. For example, the single touch and multi-touch aspects disclosed herein below may be applied to desktop computers that utilize a touchscreen or some other touch-enabled device, such as a touch-enabled track pad or touch-enabled mouse.

The computing device architecture 1500 illustrated in FIG. 15 includes a processor 1502, memory components 1504, network connectivity components 1506, sensor components 1508, input/output components 1510, and power components 1512. In the illustrated embodiment, the processor 1502 is in communication with the memory components 1504, the network connectivity components 1506, the sensor components 1508, the input/output ("I/O") components 1510, and the power components 1512. Although no connections are shown between the individuals components illustrated in FIG. 15, the components can interact to carry out device functions. In some embodiments, the components are arranged so as to communicate via one or more busses (not shown).

The processor 1502 includes a central processing unit ("CPU") configured to process data, execute computer-executable instructions of one or more application programs, and communicate with other components of the computing device architecture 1500 in order to perform various functionality described herein. The processor 1502 may be utilized to execute aspects of the software components presented herein and, particularly, those that utilize, at least in part, a touch-enabled input.

In some embodiments, the processor 1502 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 1502 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 1502 is, or is included in, a system-on-chip ("SoC") along with one or more of the other components described herein below. For example, the SoC may include the processor 1502, a GPU, one or more of the network connectivity components 1506, and one or more of the sensor components 1508. In some embodiments, the processor 1502 is fabricated, in part, utilizing a package-on-package ("PoP") integrated circuit packaging technique. Moreover, the processor 1502 may be a single core or multi-core processor.

The processor 1502 may be created in accordance with an ARM architecture, available for license from ARM HOLDINGS of Cambridge, United Kingdom. Alternatively, the processor 1502 may be created in accordance with an ×86 architecture, such as is available from INTEL CORPORATION of Mountain View, California and others. In some embodiments, the processor 1502 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1504 include a random access memory ("RAM") 1514, a read-only memory ("ROM") 1516, an integrated storage memory ("integrated storage") 1518, and a removable storage memory ("removable storage") 1520. In some embodiments, the RAM 1514 or a portion thereof, the ROM 1516 or a portion thereof, and/or some combination the RAM 1514 and the ROM 1516 is integrated in the processor 1502. In some embodiments, the ROM 1516 is configured to store a firmware, an operating system or a portion thereof (e.g., operating system kernel), and/or a bootloader to load an operating system kernel from the integrated storage 318 or the removable storage 1520.

The integrated storage 1518 can include a solid-state memory, a hard disk, or a combination of solid-state memory and a hard disk. The integrated storage 1518 may be soldered or otherwise connected to a logic board upon which the processor 1502 and other components described herein also may be connected. As such, the integrated storage 1518 is integrated in the computing device. The integrated storage 1518 is configured to store an operating system or portions thereof, application programs, data, and other software components described herein.

The removable storage 1520 can include a solid-state memory, a hard disk, or a combination of solid-state memory and a hard disk. In some embodiments, the removable storage 1520 is provided in lieu of the integrated storage 1518. In other embodiments, the removable storage 1520 is provided as additional optional storage. In some embodiments, the removable storage 1520 is logically combined with the integrated storage 1518 such that the total available storage is made available and shown to a user as a total combined capacity of the integrated storage 1518 and the removable storage 1520.

The removable storage 1520 is configured to be inserted into a removable storage memory slot (not shown) or other mechanism by which the removable storage 1520 is inserted and secured to facilitate a connection over which the removable storage 1520 can communicate with other components of the computing device, such as the processor 1502. The removable storage 1520 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1504 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1506 include a wireless wide area network component ("WWAN component") 1522, a wireless local area network component ("WLAN component") 1524, and a wireless personal area network component ("WPAN component") 1526. The network connectivity components 1506 facilitate communications to and from a network 102, which may be a WWAN, a WLAN, or a WPAN. Although a single network 102 is illustrated, the network connectivity components 1506 may facilitate simultaneous communication with multiple networks. For example, the network connectivity components 1506 may facilitate simultaneous communications with multiple networks via one or more of a WWAN, a WLAN, or a WPAN.

The network 102 may be a WWAN, such as a mobile telecommunications network utilizing one or more mobile telecommunications technologies to provide voice and/or data services to a computing device utilizing the computing device architecture 1500 via the WWAN component 1522. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 102 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 102 may be configured to provide voice and/or data communications with any combination of the above technologies. The network 102 may be configured to or adapted to provide voice and/or data communications in accordance with future generation technologies.

In some embodiments, the WWAN component 1522 is configured to provide dual- multi-mode connectivity to the network 102. For example, the WWAN component 1522 may be configured to provide connectivity to the network 102, wherein the network 102 provides service via GSM and UMTS technologies, or via some other combination of technologies. Alternatively, multiple WWAN components 1522 may be utilized to perform such functionality, and/or provide additional functionality to support other non-compatible technologies (i.e., incapable of being supported by a single WWAN component). The WWAN component 1522 may facilitate similar connectivity to multiple networks (e.g., a UMTS network and an LTE network).

The network 102 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 1524 is configured to connect to the network 102 via the WI-FI access points. Such connections may be secured via various encryption technologies including, but not limited, WI-FI Protected Access ("WPA"), WPA2, Wired Equivalent Privacy ("WEP"), and the like.

The network 102 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 1526 is configured to facilitate communications with other devices, such as peripherals, computers, or other computing devices via the WPAN.

The sensor components 1508 include a magnetometer 1530, an ambient light sensor 1532, a proximity sensor 1534, an accelerometer 1536, a gyroscope 1538, and a Global Positioning System sensor ("GPS sensor") 1540. It is contemplated that other sensors, such as, but not limited to, temperature sensors or shock detection sensors, also may be incorporated in the computing device architecture 1500.

The magnetometer 1530 is configured to measure the strength and direction of a magnetic field. In some embodiments the magnetometer 1530 provides measurements to a compass application program stored within one of the memory components 1504 in order to provide a user with accurate directions in a frame of reference including the cardinal directions, north, south, east, and west. Similar measurements may be provided to a navigation application program that includes a compass component. Other uses of measurements obtained by the magnetometer 1530 are contemplated.

The ambient light sensor 1532 is configured to measure ambient light. In some embodiments, the ambient light sensor 1532 provides measurements to an application program stored within one the memory components 1504 in order to automatically adjust the brightness of a display (described below) to compensate for low-light and high-light environments. Other uses of measurements obtained by the ambient light sensor 1532 are contemplated.

The proximity sensor 1534 is configured to detect the presence of an object or thing in proximity to the computing device without direct contact. In some embodiments, the proximity sensor 1534 detects the presence of a user's body (e.g., the user's face) and provides this information to an application program stored within one of the memory components 1504 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1534 are contemplated.

The accelerometer 1536 is configured to measure proper acceleration. In some embodiments, output from the accelerometer 1536 is used by an application program as an input mechanism to control some functionality of the application program. For example, the application program may be a video game in which a character, a portion thereof, or an object is moved or otherwise manipulated in response to input received via the accelerometer 1536. In some embodiments, output from the accelerometer 1536 is provided to an application program for use in switching between landscape and portrait modes, calculating coordinate acceleration, or detecting a fall. Other uses of the accelerometer 1536 are contemplated.

The gyroscope 1538 is configured to measure and maintain orientation. In some embodiments, output from the gyroscope 1538 is used by an application program as an input mechanism to control some functionality of the application program. For example, the gyroscope 1538 can be used for accurate recognition of movement within a 3D environment of a video game application or some other application. In some embodiments, an application program utilizes output from the gyroscope 1538 and the accelerometer 1536 to enhance control of some functionality of the application program. Other uses of the gyroscope 1538 are contemplated.

The GPS sensor 1540 is configured to receive signals from GPS satellites for use in calculating a location. The location calculated by the GPS sensor 1540 may be used by any application program that requires or benefits from location information. For example, the location calculated by the GPS sensor 1540 may be used with a navigation application program to provide directions from the location to a destination or directions from the destination to the location. Moreover, the GPS sensor 1540 may be used to provide location information to an external location-based service, such as E911 service. The GPS sensor 1540 may obtain location information generated via WI-FI, WIMAX, and/or cellular triangulation techniques utilizing one or more of the network connectivity components 1506 to aid the GPS sensor 1540 in obtaining a location fix. The GPS sensor 1540 may also be used in Assisted GPS ("A-GPS") systems.

The I/O components 1510 include a display 1542, a touchscreen 1544, a data I/O interface component ("data I/O") 1546, an audio I/O interface component ("audio I/O") 1548, a video I/O interface component ("video I/O") 1550, and a camera 1552. In some embodiments, the display 1542 and the touchscreen 1544 are combined. In some embodiments two or more of the data I/O component 1546, the audio I/O component 1548, and the video I/O component 1550 are combined. The I/O components 1510 may include discrete processors configured to support the various interface described below, or may include processing functionality built-in to the processor 1502.

The display 1542 is an output device configured to present information in a visual form. In particular, the display 1542 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 1542 is a liquid crystal display ("LCD") utilizing any active or passive matrix technology and any backlighting technology (if used). In some embodiments, the display 1542 is an organic light emitting diode ("OLED") display. Other display types are contemplated.

The touchscreen 1544 is an input device configured to detect the presence and location of a touch. The touchscreen 1544 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 1544 is incorporated on top of the display 1542 as a transparent layer to enable a user to use one or more touches to interact with objects or other information presented on the display 1542. In other embodiments, the touchscreen 1544 is a touch pad incorporated on a surface of the computing device that does not include the display 1542. For example, the computing device may have a touchscreen incorporated on top of the display 1542 and a touch pad on a surface opposite the display 1542.

In some embodiments, the touchscreen 1544 is a single-touch touchscreen. In other embodiments, the touchscreen 1544 is a multi-touch touchscreen. In some embodiments, the touchscreen 1544 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1544. As such, a developer may create gestures that are specific to a particular application program.

In some embodiments, the touchscreen 1544 supports a tap gesture in which a user taps the touchscreen 1544 once on an item presented on the display 1542. The tap gesture may be used for various reasons including, but not limited to, opening or launching whatever the user taps. In some embodiments, the touchscreen 1544 supports a double tap gesture in which a user taps the touchscreen 1544 twice on an item presented on the display 1542. The double tap gesture may be used for various reasons including, but not limited to, zooming in or zooming out in stages. In some embodiments, the touchscreen 1544 supports a tap and hold gesture in which a user taps the touchscreen 1544 and maintains contact for at least a pre-defined time. The tap and hold gesture may be used for various reasons including, but not limited to, opening a context-specific menu.

Although the above gestures have been described with reference to the use one or more fingers for performing the gestures, other appendages such as toes or objects such as styluses may be used to interact with the touchscreen 1544. As such, the above gestures should be understood as being illustrative and should not be construed as being limiting in any way. In addition, it should be noted that the gestures described above with reference to FIGS. 2-11 also can be supported by the touchscreen 1544.

The data I/O interface component 1546 is configured to facilitate input of data to the computing device and output of data from the computing device. In some embodiments, the data I/O interface component 1546 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 1548 is configured to provide audio input and/or output capabilities to the computing device. In some embodiments, the audio I/O interface component 1548 includes a microphone configured to collect audio signals. In some embodiments, the audio I/O interface component 1548 includes a headphone jack configured to provide connectivity for headphones or other external speakers. In some embodiments, the audio interface component 1548 includes a speaker for the output of audio signals. In some embodiments, the audio I/O interface component 1548 includes an optical audio cable out.

The video I/O interface component 1550 is configured to provide video input and/or output capabilities to the computing device. In some embodiments, the video I/O interface component 1550 includes a video connector configured to receive video as input from another device (e.g., a video media player such as a DVD or BLURAY player) or send video as output to another device (e.g., a monitor, a television, or some other external display). In some embodiments, the video I/O interface component 1550 includes a High-Definition Multimedia Interface ("HDMI"), mini-HDMI, micro-HDMI, DisplayPort, or proprietary connector to input/output video content. In some embodiments, the video I/O interface component 1550 or portions thereof is combined with the audio I/O interface component 1548 or portions thereof The camera 1552 can be configured to capture still images and/or video. The camera 1552 may utilize a charge coupled device ("CCD") or a complementary metal oxide semiconductor ("CMOS") image sensor to capture images. In some embodiments, the camera 1552 includes a flash to aid in taking pictures in low-light environments. Settings for the camera 1552 may be implemented as hardware or software buttons.

Although not illustrated, one or more hardware buttons may also be included in the computing device architecture 1500. The hardware buttons may be used for controlling some operational aspect of the computing device. The hardware buttons may be dedicated buttons or multi-use buttons. The hardware buttons may be mechanical or sensor-based.

The illustrated power components 1512 include one or more batteries 1554, which can be connected to a battery gauge 1556. The batteries 1554 may be rechargeable or disposable. Rechargeable battery types include, but are not limited to, lithium polymer, lithium ion, nickel cadmium, and nickel metal hydride. Each of the batteries 1554 may be made of one or more cells.

The battery gauge 1556 can be configured to measure battery parameters such as current, voltage, and temperature. In some embodiments, the battery gauge 1556 is configured to measure the effect of a battery's discharge rate, temperature, age and other factors to predict remaining life within a certain percentage of error. In some embodiments, the battery gauge 1556 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1512 may also include a power connector, which may be combined with one or more of the aforementioned I/O components 1510. The power components 1512 may interface with an external power system or charging equipment via a power I/O component (not shown).

Based on the foregoing, it should be appreciated that technologies for switching between inclusive and exclusive modes with respect to range controls of a range filter UI have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

We claim:

1. A computer-readable storage medium having computer-executable instructions stored thereupon which, when executed by a computer, cause the computer to:
    display a range slider, the range slider comprising:
        a lower range control corresponding to a lower range value;
        an upper range control corresponding to an upper range value; and
        a defined range comprising all values between the lower range value and the upper range value, wherein the upper range control and the lower range control are each associated with only one defined range;
    receive a selection of a range control, the range control being one of the lower range control or the upper range control and the range control having a current mode comprising an exclusive mode;
    when the selection is determined to be a static selection, perform steps comprising:
        switching the current mode from the exclusive mode to an inclusive mode, wherein the exclusive mode excludes a value associated with the range control, and wherein the inclusive mode includes the value associated with the range control; and
        modifying a visual treatment associated with the range control according to the current mode;
    when the selection is determined to involve moving the range control to a position at an end of the range slider, perform steps comprising:
        switching the current mode from the exclusive mode to the inclusive mode, wherein the exclusive mode excludes a value associated with the range control, and wherein the inclusive mode extends the defined range to have no lower limit or no upper limit according to the position of the range control;
        modifying a visual treatment associated with the range control according to the current mode; and
        displaying a limit control at the end of the range slider corresponding to the position of the range control, wherein selection of the limit control causes the current mode to switch from the inclusive mode to the exclusive mode.

2. The computer-readable storage medium of claim 1, wherein the visual treatment associated with the range control matches a visual treatment associated with the range slider, representing the range control is in the inclusive mode.

3. The computer-readable storage medium of claim 1, wherein the visual treatment comprises a pattern.

4. The computer-readable storage medium of claim 3, wherein the visual treatment further comprises a symbol or the value positioned on the range control.

5. The computer-readable storage medium of claim 4, wherein the symbol comprises a greater than symbol, a less than symbol, a greater than or equal to symbol or a less than or equal to symbol.

6. The computer-readable storage medium of claim 1, wherein the lower range control has been moved to the end of the range slider and wherein the defined range is modified to have no lower limit.

7. The computer-readable storage medium of claim 1, wherein the visual treatment comprises an animation.

8. The computer-readable storage medium of claim 1, having further computer-executable instructions stored thereupon to provide a textual range summary indicating the current mode in a textual description of the range control.

9. The computer-readable storage medium of claim 1, wherein to determine that the selection of the range control is a static selection comprises to determine that the range control is neither being dragged nor being moved when the range control is being tapped or clicked on.

10. A computer comprising a processor and a computer-readable storage medium having computer-readable instructions stored thereupon that, when executed by the processor, cause the computer to:
    display a range slider, the range slider comprising:
        a lower range control corresponding to a lower range value;
        an upper range control corresponding to an upper range value; and
        a defined range comprising all values between the lower range value and the upper range value, wherein the upper range control and the lower range control are each associated with only one defined range;

receive a selection of a range control, the range control being one of the lower range control or the upper range control and the range control having a current mode comprising an exclusive mode;

when the selection is determined to be a static selection, perform steps comprising:

switch the current mode from the exclusive mode to an inclusive mode, wherein the exclusive mode excludes a value associated with the range control, and wherein the inclusive mode includes the value associated with the range control; and modify a visual treatment associated with the range control according to the current mode;

when the selection is determined to involve moving the range control to a position at an end of the range slider, perform steps comprising:

switch the current mode from the exclusive mode to the inclusive mode, wherein the exclusive mode excludes a value associated with the range control, and wherein the inclusive mode extends the defined range to have no lower limit or no upper limit according to the position of the range control;

modify a visual treatment associated with the range control according to the current mode; and display a limit control at the end of the range slider corresponding to the position of the range control, wherein selection of the limit control causes the current mode to switch from the inclusive mode to the exclusive mode.

11. The computer of claim 10, wherein the visual treatment comprises a pattern.

12. The computer of claim 10, wherein to determine that the selection of the range control is a static selection comprises to determine that the range control is neither being dragged nor being moved when the range control is being tapped or clicked on.

13. A computer-implemented method for modifying a defined range associated with a range slider, the method comprising:

displaying the range slider, the range slider having a lower range control corresponding to a lower range value and an upper range control corresponding to an upper range value, the range slider comprising:

a defined range comprising all values between the lower range value and the upper range value, wherein the upper range control and the lower range control are each associated with only one defined range;

receiving a selection of a range control, the range control being one of the lower range control or the upper range control and the range control having a current mode comprising an exclusive mode;

when the selection is determined to be a static selection, perform steps comprising;

switching a current mode from an exclusive mode to an inclusive mode, wherein the exclusive mode excludes a value associated with the range control, and wherein the inclusive mode includes the value associated with the range control; and modifying a visual treatment associated with the range control according to the current mode;

when the selection is determined to involve moving the range control to a position at an end of the range slider, perform steps comprising;

switching the current mode from the exclusive mode to the inclusive mode, wherein the exclusive mode excludes a value associated with the range control, and wherein the inclusive mode extends the defined range to have no lower limit or no upper limit according to the position of the range control;

modifying a visual treatment associated with the range control according to the current mode; and displaying a limit control at the end of the range slider corresponding to the position of the range control, wherein selection of the limit control causes the current mode to switch from the inclusive mode to the exclusive mode.

14. The computer-implemented method of claim 13, wherein the visual treatment comprises a pattern.

15. The computer-implemented method of claim 13, wherein switching the current mode associated with the range control between inclusive and exclusive modes comprises switching the current mode from exclusive mode to inclusive mode, and wherein modifying the visual treatment associated with the range control according to the current mode comprises modifying the visual treatment associated with the range control to match a visual treatment associated with the range slider.

16. The computer-implemented method of claim 13, wherein the visual treatment comprises an animation.

17. The computer-implemented method of claim 13, further comprising providing a textual range summary indicating the current mode in a textual description of the range control.

18. The computer-implemented method of claim 13, wherein to determine that the selection of the range control is a static selection comprises to determine that the range control is neither being dragged nor being moved when the range control is being tapped or clicked on.

\* \* \* \* \*